(12) United States Patent
Pardhasarathy et al.

(10) Patent No.: US 11,785,612 B2
(45) Date of Patent: Oct. 10, 2023

(54) METHODS TO REDUCE NUMBER OF BLIND DECODING ATTEMPTS DONE BY A USER EQUIPMENT

(71) Applicants: Centre of Excellence in Wireless Technology, Tamil Nadu (IN); Indian Institute of Technology Madras, Tamil Nadu (IN)

(72) Inventors: Jyothi Pardhasarathy, Chennai (IN); Deepak Agarwal, Chennai (IN); Ebin Chacko, Chennai (IN); Budama Sree Charan Teja Reddy, Chennai (IN); Chandrasekaran Mohandoss, Chennai (IN); Thirunageswaram Ramachandran Ramya, Chennai (IN); Sunil Kaimalettu, Chennai (IN); Jeniston Deviraj Klutto Milleth, Chennai (IN); Bhaskar Ramamurthi, Chennai (IN)

(73) Assignees: Centre of Excellence in Wireless Technology, Chennai (IN); Indian Institute of Technology Madras, Chennai (IN)

( * ) Notice: Subject to any disclaimer, the term of this patent is extended or adjusted under 35 U.S.C. 154(b) by 67 days.

(21) Appl. No.: 17/450,892

(22) Filed: Oct. 14, 2021

(65) Prior Publication Data
US 2022/0116980 A1    Apr. 14, 2022

(30) Foreign Application Priority Data

Oct. 14, 2020    (IN) .............................. 202041044807

(51) Int. Cl.
*H04W 72/10* (2009.01)
*H04L 5/00* (2006.01)
*H04W 72/23* (2023.01)

(52) U.S. Cl.
CPC ........... *H04W 72/23* (2023.01); *H04L 5/0048* (2013.01)

(58) Field of Classification Search
CPC ............................ H04W 72/23; H04L 5/0048
See application file for complete search history.

(56) References Cited

U.S. PATENT DOCUMENTS

2017/0373793 A1    12/2017    Yerramalli et al.

FOREIGN PATENT DOCUMENTS

KR    20140031793    3/2014

*Primary Examiner* — Ronald B Abelson
(74) *Attorney, Agent, or Firm* — Fish & Richardson P.C.

(57) ABSTRACT

The present invention relates to a method of reducing blind decoding attempts by a User Equipment (UE) in a telecommunication network. The method comprises configuring a Search Space (SS) configuration to the UE. A Base Station (BS) signals one of a subset of Aggregation Levels (ALs) to be monitored based on channel quality of the UE and an associated time period, and a value of multiplication factor (k) and an associated time period. The UE iteratively monitors a Physical Downlink Control Channel (PDCCH) on the ALs signalled by the BS till the UE stops receiving a new configuration. The UE performs one of adopting an original configuration, requesting the BS for a new configuration, utilizing a default configuration or utilizing an original configuration.

6 Claims, 19 Drawing Sheets

METHODS TO REDUCE NUMBER OF BLIND DECODING ATTEMPTS DONE BY A USER EQUIPMENT

FIELD OF THE INVENTION

The present invention relates to cellular wireless communication systems, and more particularly to reducing the number of blind decoding attempts done by a user equipment.

BACKGROUND OF THE INVENTION

The ever-increasing demand for high data rates and the increasing user density lead to cellular wireless communication systems employing very high bandwidths. In systems such as fifth generation (5G) New Radio (NR) systems, the bandwidth allocated to an individual User Equipment (UE) can be smaller than the system bandwidth. The UE bandwidth within a carrier bandwidth is configured by the Base Station (BS/gNB) as the number of contiguous Physical Resource Blocks (PRBs) with an associated Sub Carrier Spacing (SCS) and is called a BandWidth Part (BWP). Once a BWP is activated, the data and the control channels are received/transmitted within the BWP. In 5G-NR systems, a UE can be configured with multiple BWPs, wherein different BWPs with the same or different SCSs may be partially overlapping or non-overlapping in frequency. If more than one BWP is configured for a UE, the BS may select one active BWP at a given time. One Resource Block (RB) contains 12 Resource Elements (RE) in frequency domain similar to fourth generation (4G) Long-Term Evolution (LTE). In 4G-LTE, RB bandwidth is fixed to 180 KHz but in 5G-NR it is not fixed and depends on the SCS used.

The data and signalling messages in NR are carried in the DownLink (DL) and UpLink (UL) physical channels. Among these channels, the DL control channel plays a vital role in transmitting messages such as DL scheduling assignments, UL scheduling grants and special purpose messages such as slot format indication, pre-emption indication, power control etc. In 4G and 5G, the DL control channel is called Physical Downlink Control Channel (PDCCH). PDCCH provides communication of control messages with low latency and high reliability. The information carried by the control channel is referred to as Downlink Control Information (DCI). The DCI contains the scheduling and other control information for the UL and DL data channels for either one UE or a group of UEs. Several formats of DCIs are defined based on the type of control information. The DCI format(s) transmitted to a UE at a particular time instant depends on the control information the BS wants to indicate to the UE. The parameters associated with the DCI are not fully known to the UE. Therefore, the UE performs blind decoding on the received DCI. This leads to high power consumption and receiver complexity.

In the case of UEs with reduced capabilities, power saving and complexity reduction are major requirements. Reducing the number of blind decoding attempts of the control channel is one way to reduce the complexity and power consumption. In case of systems operating in very high carrier frequencies, the effective time duration available for processing of different physical channels decreases. This also limits the time available for blind decoding of control channel. Therefore, reducing the number of blind decoding attempts becomes necessary in such cases. This invention proposes methods to reduce blind decoding attempts of the control channel.

The DCI carries different types of control information, and the payload of the DCI depends on the type of information to be conveyed. A Cyclic Redundancy Check (CRC) is computed for the DCI payload bits and CRC bits are formed. The CRC bits are masked with a Radio Network Temporary Identifier (RNTI) and the masked CRC bits are appended to the DCI payload bits. The RNTI varies based on the type of control information. Interleaving and channel encoding are performed on the resulting stream of bits containing payload and CRC. Examples of the channel coding used for the control channel are convolution coding, turbo coding, polar coding etc. The encoded bits are interleaved in sub-blocks and rate matched and scrambled. The scrambled DCI sequence is Quadrature Phase Shift Keying (QPSK) modulated.

The modulated symbols are mapped to physical resources allocated for the control channel. In 5G-NR system, the basic resource units for the control channel are called Control Channel Elements (CCEs). Each CCE consists of six Resource Element Groups (REGs), where an REG is defined as one PRB in one OFDM symbol. There is one reference signal for every 4 REs and therefore, one REG contains nine REs for the control channel payload and three reference signal REs. The DCIs can occupy either 1, 2, 4, 8, or 16 CCEs. The number of CCEs used for a DCI is denoted as Aggregation Level (AL). Each CCE contains 54 REs for control channel payload. Therefore, with QPSK modulation, each CCE can carry 108 bits. The output size of the rate matching block should be size (L*108) when 'l' is the aggregation level associated with a DCI. The suitable value for AL is chosen by the BS based on the channel quality of the particular UE and the size of the DCI payload. The BS can adaptively choose a proper AL for a DCI to adjust code rate, based on the channel environment and the available resources.

There may be several DCIs transmitted to a UE in a slot, and there is a time-frequency region defined for transmitting the control channel. In 5G-NR system, this region is called the Control Resource Set (CORESET). In 5G-NR, a UE may be configured with up to three CORESETs on each of up to four BWPs on a serving cell. A CORESET is configured in units of six PRBs and up to three consecutive OFDM symbols in the time domain.

When a DCI is associated with AL of L, the DCI occupies L continuously numbered CCEs and the CCEs are mapped on a number of REGs in a CORESET. In case of 5G, both distributed and localized resource allocation for a DCI in a CORESET are supported. This is done by configuring interleaved or non-interleaved CCE-to-REG mapping for each CORESET. For interleaved CCE-to-REG mapping, REG bundles constituting the CCEs for a control channel are distributed in the frequency domain in units of REG bundles. A REG bundle is a set of indivisible resources consisting of neighbouring REGs. A REG bundle spans across all OFDM symbols for the given CORESET. Interleaved CCE-to-REG mapping can be visualized as a process for which REG bundle indices are continuously filled in an array row-wise and then read out column-wise. This process is often called block interleaving whereby adjacent CCEs for a PDCCH control channel are broken down into scattered REG bundles in the frequency domain. On the other hand, for non-interleaved CCE-to-REG mapping, all CCEs for a DCI with AL of 'l' are mapped in consecutive REG bundles of the CORESET.

Once the REGs corresponding to a DCI are determined, the modulated symbols of the DCI are mapped to the REs of the determined REGs in the frequency domain first and followed by time domain, i.e., in increasing order of the RE index and symbol index respectively. The steps involved in control channel processing are shown in FIG. 1a.

The parameters associated with a DCI in a slot are not known to the UE. These parameters include the number of DCIs and their formats in a given slot, the actual AL used for DCI and the location of the DCI within the CORESET. Therefore, the UE needs to perform blind decoding on a set of PDCCH control channel candidates. In 5G systems, certain time-frequency regions within the CORESET are assigned to a UE for monitoring the DCI. These regions are called Search Space (SS) sets. PDCCH candidates to be monitored are configured for a UE by means of SS sets. There are two SS set types: Common SS (CSS) set, which is commonly monitored by a group of UEs in the cell and UE-specific SS (USS) set, which is monitored by an individual UE. A UE can be configured with up to 10 SS sets each for up to four BWPs in a serving cell. Therefore, a UE can be configured with up to 40 SS sets, where each SS has an index of 0-39. A SS set configuration provides a UE with the SS set type (CSS set or USS set), DCI format(s) to be monitored, monitoring occasion that includes periodicity and offset, and the number of PDCCH candidates for each AL in the SS set. A SS set with index s is associated with only one CORESET with index p.

The UE determines the slots in which a particular SS set with index s needs to be monitored based on the higher layer parameters such periodicity k, offset o, and duration d. The periodicity k and offset o provide the starting slot for monitoring the SS and duration d provides the number of consecutive slots where the SS set is monitored starting from the slot identified by k and o.

Monitoring occasions of a SS set with index within the slot are configured by a bitmap parameter in the SS set configuration. Each bit representing an OFDM symbol within the slot and corresponds to the first OFDM symbol of the monitoring occasion of the SS set. For example, when bit '1' is set, the monitoring occasion starts from the lth symbol in the slot. The mapping of PDCCH control channel candidates of an SS set to CCEs of the associated CORESET is implemented by means of the hash function.

When a UE is configured with more than one SS set, the number of control channel candidates varies across slots due to independent monitoring occasions for the SS sets and slot-dependent hashing of different ALs for each SS set. Therefore, certain times, a BS is allowed to configure the UE with a number of PDCCH control channel candidates per slot that exceeds the UE capability, which is referred to as overbooking. The UE and BS map control channel PDCCH candidates in each slot based on the configuration, according to the following mapping rules: (i) CSS sets are mapped before USS sets, (ii) USS sets are mapped in ascending order of the SS set indices, and if the number of control channel candidates exceeds the UE processing limit, then (iii) no more SS sets are mapped in the slot after reaching the UE processing limit.

An example of mapping SS sets is illustrated in FIG. 2. The SCS is assumed to be 15 KHz. According to the figure, a UE is configured with four SS sets in which CSS1 and CSS2 are configured as common SS sets and USS1 and USS2 are configured as UE-specific SS sets. Each SS set is configured with a periodicity and offset. Periodicity and offset for CSS1 is 4 slots and 2 slots, for CSS2 is 3 slots and 1 slot, for USS1 is 1 slot and 0 slots and for USS2 is 2 slots and 1 slot. Each SS set is configured with number of candidates for all ALs. For example, CSS1 is configured with 3 candidates for AL=11, 5 candidates for AL=12 and 1 candidate for AL=14 and 0 candidates for AL of 8 and 16. As shown in the FIG. 2, overbooking happens in slots 2, 4 and 6 where UE will not be able to monitor in USS2.

In FIG. 2, it is shown that the DCI format is configured for each of the SS set. For example, CSS1 is configured with DCI format 2_0, i.e., SFI-RNTI. The payload size and RNTI used for CRC scrambling for a DCI format are configured in the SS set.

There are various DCI formats and RNTIs. The type of DCI payload varies based on the DCI format. Downlink scheduling assignments are supported by DCI format 1_0 or fallback format and DCI format1_1 or the non-fallback format. DCI format 1_0 is particularly needed for scheduling system information, paging and system information change notification, random access response, and contention resolution. UL scheduling grants are supported by DCI format 0_0 a.k.a. fallback format and DCI format 0_1 a.k.a. non-fallback format. Apart from these, there are DCIs used for special purposes, which are shared among multiple UEs. The size of the DCI depends on the type of payload. RNTIs also vary with the DCI format.

Since DCI can be of different sizes, UE needs to perform blind decoding corresponding to different sizes. For example, a 5G capable UE can monitor up to three different DCI sizes using the C-RNTI. Additionally, the UE is capable of monitoring one additional DCI size using RNTIs for special purposes such as SFI-RNTI and INT-RNTI. Due to the constraint of the DCI size budget, the sizes of some DCI formats need to be aligned by padding, truncation, and/or determining the frequency domain resource assignment field differently. A UE monitors DCI format 0_0 and 1_0 as one payload size and 0_1 and 1_1 as one payload size. The steps involved in the decoding of control channel information is shown in flowchart in FIG. 1b.

Considering the different formats, sizes and ALs, an exhaustive list of blind decoding attempts will be huge. Therefore, it is necessary to impose limits on the maximum number of BDs a UE can perform in a slot. For example, the limits on the maximum number of BDs in a slot imposed in 5G is shown in Table 1 and the limit is defined per numerology. As shown in the table, as the SCS increases, the number of BDs per slot will also reduce due to the fact that the OFDM symbol size will reduce.

TABLE 1

| Limit on number of BDs per slots | |
|---|---|
| Numerology | No. of BDs per slot per serving cell |
| 0 | 44 |
| 1 | 36 |
| 2 | 22 |
| 3 | 20 |

This existing limit on the number of BDs is still high for some power limited or low-complexity UEs and also for UEs operating in very high frequencies. Hence, further reduction in the number of BDs per slot is needed. However, further reduction in the limit of maximum number of BDs per slot will reduce the scheduling flexibility drastically. Some novel methods to reduce the number of BDs performed by a UE per slot without affecting the scheduling flexibility are proposed in this invention.

SUMMARY OF THE INVENTION

The present invention relates to a method of controlling blind decoding attempts by a User Equipment (UE) in a telecommunication network. In one implementation, the method may comprise configuring, by a Base Station (BS), a first Search Space (SS) configuration to the UE. The BS may configure a second SS configuration. The second configuration is one of: i) a subset of Aggregation Levels (ALs) to be monitored based on channel quality of the UE and Downlink Control Information (DCI) payload and an associated time period, and ii) one or more values of multiplication factor (k) associated with one or more of the ALs and an associated time period. The BS may signal at least one of the first SS configuration and second SS configuration to the UE. The UE may iteratively monitor DCI based on the ALs signalled by the BS. The UE may perform one of blind decoding using received second SS configuration when the new second SS configuration is received before the timer expiry and the blind decoding by one of utilizing a default second SS configuration, adopting the existing second SS configuration, requesting the BS for a new second SS configuration and, utilizing the first SS configuration when the new second SS configuration is not received by the UE before the timer expires.

In one aspect, the UE may monitor the DCI based on the existing configuration until a predefined time period expires. Further, the UE may determine a number of DCI candidates in each AL in all SS sets based on the value of multiplication factor (k).

In one aspect, the method may include the UE sending a feedback signal including a subset of AL values selected from the list of ALs, in the first SS configuration to the gNB. The subset of AL values may be selected by the UE based on at least one of previous blind decoding attempts at the UE and channel conditions. The gNB may select a usable AL from the subset of AL values based on at least one of DCI payload size and channel conditions. The UE may perform the blind decoding based on the subset of ALs informed to the gNB through the feedback signal.

In another implementation, the method of controlling blind decoding attempts by a User Equipment (UE) in a telecommunication network may comprise a Base Station (BS) configuring a first search space configuration to the UE. The BS may configure a second SS configuration. The second SS configuration is type of SS to be one of monitored and not monitored for each slot in a given time period. The BS may signal at least one of the first SS configuration and the second SS configuration to the UE. The UE may iteratively monitor for Downlink Control Information (DCI) in at least one of Common SS (CSS) and UE-specific SS (USS) in at least one slot present in the given time period, based on a configuration corresponding to the at least one slot. The UE may perform one of blind decoding using received second SS configuration when the new second SS configuration is received before the timer expiry and the blind decoding by one of utilizing a default second SS configuration, adopting the existing second SS configuration, requesting the BS for a new second SS configuration and utilizing the first SS configuration when the new second SS configuration is not received by the UE before the timer expires.

In one aspect, the UE may monitor at least one of the CSS and the USS until a predefined time period expires.

In another implementation, the method of controlling blind decoding attempts by a User Equipment (UE) in a telecommunication network may comprise a Base Station (BS) configuring a first Search Space (SS) configuration to the UE. The BS may configure a second SS configuration to the UE, wherein the second SS configuration is at least one multiplication factor (c) for at least one SS set and an associated time period. The BS may signal at least one of first SS configuration and second SS configuration to the UE. The UE may update a payload size of the Downlink Control Information (DCI) for the at least one SS set and scaling AL size based on the at least one multiplication factor (c). The UE may iteratively monitor for 'c' concatenated DCIs in the at least one SS set with the updated payload size and AL size. The concatenated DCIs belong to one of the same format and same Radio Network Temporary Identifier (RNTI). The UE may perform one of blind decoding using received second SS configuration when the new second SS configuration is received before the timer expiry and the blind decoding by one of utilizing a default second SS configuration, adopting the existing second SS configuration, requesting the BS for a new second SS configuration and utilizing the first SS configuration when the new second SS configuration is not received by the UE before the timer expires.

In one aspect, the UE may update the payload size of DCI to be monitored for the at least one SS set and scales the AL size when the UE receives a new configuration.

In yet another implementation, the method of controlling blind decoding attempts by a User Equipment (UE) in a telecommunication network comprises receiving, by the UE, a first Downlink Control Information (DCI) in a Search Space (SS) by a Base Station (BS). The UE may determine if a flag to indicate at least one second DCI is present in data channel is enabled in the first DCI. The UE may perform one of receiving subsequent DCI for a next process in a data channel of previous process and receiving at least one second DCI scheduled for the UE in the data channel of the primary process, when the flag is determined to be enabled. Thereupon, the UE may monitor for the at least one second DCI in the SS when the flag is determined to be disabled.

In one aspect, the UE may receive information of a number of bits occupied by the at least one second DCI and format of the at least one second DCI through a UE specific field present in the DCI within a control channel of the primary carrier along with the flag.

In another aspect, the UE may receive information of a total number of the at least one second DCI and format of the at least one second DCI through a UE specific field present in the DCI within a control channel of the primary carrier along with the flag.

In another aspect, the UE may receive a size of at least one second DCI and format of at least one second DCI through information about DCI before DCI payload present at start of data region.

In another aspect, the UE may receive a total number of at least one second DCI and format of at least one second DCI through information about DCI before DCI payload present at start of data region.

In yet another implementation, the method of controlling blind decoding attempts by a User Equipment (UE) in a telecommunication network comprises configuring, by a Base Station (BS), at least one of a Search Space (SS) configuration and a value of number of Downlink Control Information (DCIs) the UE to monitor for at least one format, within a predefined time period. The BS may signal the configuration to the UE. Upon receiving the configuration signalled by the BS, the UE may monitor for the DCI in all SS sets. The UE may count number of DCIs received for each of the at least one formats. The UE may determine if the number of DCIs for each of the at least one format exceeds a predefined number of DCIs the UE is allowed to monitor. The UE may stop monitoring of Physical Downlink Control Channel (PDCCH) candidates associated with one or more DCI formats identified to exceed the predefined number of DCIs the UE is allowed to receive. The UE may remove PDCCH candidates corresponding to the exceeded DCI formats in remaining slots present within the predefined time period.

In one aspect, when the UE receives new configurations, resets count of the number of DCIs to zero, and performs the monitoring for DCI based on the new configuration.

In another aspect, the UE may determine if a timer associated with receipt of the DCIs has expired. When the timer expires, count values of the DCIs corresponding to the formats are reset to zero and the UE performs the monitoring for DCI.

In yet another aspect, the signalling may be performed using one or more of Radio Resource Control (RRC) signalling, Medium Access Control-Control Element (MAC-CE) signalling, and L1 signalling.

In still another implementation, the method of controlling blind decoding attempts by a User Equipment (UE) in a telecommunication network comprises configuring, by a Base Station (BS), a Search Space (SS) configuration to the UE. The UE may receive a Downlink Control Information (DCI) in a Search Space (SS) configured by a BS. The UE may determine if all Physical Downlink Control Channel (PDCCH) candidates of all SS are monitored when the indicator bit in the DCI received in SS with identity i is determined to be set and may remove PDCCH candidates corresponding to SS with identity greater than i from PDCCH candidates for blind decoding when the indicator bit in the DCI received in SS with identity i is determined not to be set. The UE may resume the blind decoding when it is determined that all the candidates for all configured SS are not monitored.

In yet another implementation, the method of controlling blind decoding attempts by a User Equipment (UE) in a telecommunication network comprises receiving, by the UE, a Downlink Control Information (DCI) indicating a number (N) of DCIs scheduled in a SS or a slot, wherein the number (N) of DCIs are signalled in all the DCIs. The UE may determine if the count of DCIs received in the SS or the slot is equal to the number (N) of DCIs. The UE may remove remaining Physical Downlink Control Channel (PDCCH) candidates for blind decoding present in the SS or the slot when the count of DCIs received in the SS or the slot is identified to be equal to the number (N) of DCIs and then resume the blind decoding procedure in other SS or slots, or resuming the blind decoding procedure when the count of DCIs received in the SS or the slot is identified to be not equal to the number (N) of DCIs.

In yet another implementation, the method of controlling blind decoding attempts by a User Equipment (UE) in a telecommunication network comprises configuring, by a Base Station (BS), a Search Space (SS) configuration to the UE. The BS may divide the Downlink Control Information (DCI)s into high priority and low priority DCIs. The BS may schedule high priority Downlink Control Information (DCIs) prior to low priority DCIs. The UE may monitor for a DCI in SS based on the SS configuration. The UE may determine if an indicator for a last DCI with high priority is received. The UE may resume the monitoring for the DCI in the SS when the indicator for the last DCI with high priority is not received, and may not monitor for remaining DCIs with low priority when the indicator for the last DCI with high priority is received and it is determined that the UE can afford loss of the remaining DCIs with low priority.

In one aspect, when the last DCI with high priority is identified to be present in CSS, an indicator field is present in a bit map form for all UEs receiving the DCI in the CSS or a separate UE index and an associated indicator flag is present for each of the UEs receiving the DCI in the CSS.

In another aspect, when the DCI is present in USS, only an indicator field is present.

In yet another implementation, the method of controlling blind decoding attempts by a User Equipment (UE) in a telecommunication network comprises decoding, by the UE, Downlink Control Information (DCI) present in a slot. The UE may identify an indication of Search Set (SS) index of consecutive DCI present in the slot. The UE may determine if the next consecutive DCI is present in a Common SS (CSS). The UE may identify UE specific indicator field including a UE index and an SS index of the consecutive DCI for the UE when the DCI is identified to be present in the CSS, and may disable the UE specific indicator field and only including an SS index when the DCI is identified to be present in USS.

In one aspect, SS index may be communicated in a round robin manner, wherein a last DCI may contain the SS index of the first DCI.

In one implementation, the method of controlling blind decoding attempts by a User Equipment (UE) in a telecommunication network may comprise generating, by the UE, a first list of Physical Downlink Control Channel (PDCCH) candidates. A Demodulation Reference Signals (DMRS) correlator may determine DMRS correlation values for each candidate present in the first list of PDCCH candidates. The DMRS correlation values may be determined between received DMRS sequences and corresponding original DMRS sequences. The UE may update the first list of PDCCH candidates based on at least one DMRS correlation threshold to obtain a first updated list of PDCCH candidates. A channel correlator may determine channel correlation values between the estimated channel coefficients corresponding to different Resource Element Groups (REGs) of same REG bundle for each PDCCH candidate from first updated list of PDCCH candidates. The UE may update the first updated list of PDCCH candidates based on at least one channel correlation threshold, to obtain a second updated list of PDCCH candidates. The UE may estimate, using a Signal to Noise plus Interference Ratio (SINR) estimator, SINR for each PDCCH candidate present in the second updated list of PDCCH candidates, on the DMRS resource elements. Further, estimated SINR may be mapped to a possible Aggregation Level (AL) set. The UE may update the second updated list of PDCCH candidates based on the possible AL set to obtain a final updated PDCCH candidate list for performing blind decoding.

In one aspect, the signalling of at least one of DMRS correlation threshold, channel correlation threshold and mapping between SINR and AL may be performed using at least one of Radio Resource Control (RRC) signalling, Medium Access Control-Control Element (MAC-CE) signalling, and L1 signalling.

In another aspect, at least one of the first list of PDCCH candidates, the first updated list of PDCCH candidates, and the second updated list of PDCCH candidates may be updated by performing one of deletion of a PDDCH candidate and de-prioritization of a PDDCH candidate.

In yet another implementation, the method of controlling blind decoding attempts by a User Equipment (UE) in a telecommunication network comprises generating, by the UE, reference Demodulation Reference Signals (DMRS) sequences for all Orthogonal Frequency Division Multiplexing (OFDM) symbols present in a Search Space (SS). The UE may select a combination of positions of the DMRS sequences. The UE may compute Reference Signal Received Power (RSRP) using the received signal at the selected combination and the reference DMRS sequences. The UE may determine presence of DMRS and select another combination of positions of the DMRS sequences when the DMRS is not identified to be present, and obtain information conveyed by position of the DMRS when the DMRS is identified to be present.

In yet another implementation, the method of controlling blind decoding attempts by a User Equipment (UE) in a telecommunication network comprises signalling by the Base Station (BS), the first information about a plurality of sub-regions within a Control Resource Set (CORESET). The BS may signal, to the UE, the second information about at least one sub-region to be monitored amongst the plurality of sub-regions. The UE may divide the CORESET into a plurality of sub-regions, based on the first information received from the BS. The UE may generate a list of Physical Downlink Control Channel (PDCCH) candidates. The UE may select a PDCCH candidate from the list of PDCCH candidates. The UE may determine if the PDCCH candidate starts within the at least one sub-region in the second information. The UE may process the PDCCH candidate when the PDCCH candidate identified to be starting within the at least one sub-region in the second information, and may select a next PDCCH candidate when the PDCCH candidate is identified not to be starting within the at least one sub-region in the second information.

In one aspect, the signalling of the first information and the second information may be performed using one or more of Radio Resource Control (RRC) signalling, Medium Access Control-Control Element (MAC-CE) signalling, and L1 signalling.

In another implementation, the method of controlling blind decoding attempts by a User Equipment (UE) in a telecommunication network comprises configuring, by a Base Station (BS), a Search Space (SS) configuration for the UEs. The BS ma configure a bitmap of SS to be monitored by the UE. The BS may signal one of the bitmap and an index of the table containing all combinations of bitmaps to the UE. The bitmap may include information related to at least one SS containing Downlink Control Information (DCI). The UE may monitor the DCI based on the SS configuration till the bitmap is received from the BS. The UE may further monitor a SS for which a corresponding bit is enabled in the bitmap and excluding monitoring of remaining SS.

In one aspect, the bitmap may be prepared based on parameters including traffic of the UE, previous scheduling patterns for the UE, number of UEs in a cell, channel quality of the UE, and compromise in scheduling flexibility.

In yet another aspect, the bitmap may be sent through a RRC message, MAC CE or DCI, in a semi periodic approach. The bitmap may be configured for a predefined time period in the semi periodic approach and the UE performs blind decoding till expiry of the predefined time period.

In yet another aspect, the BS may schedule the DCIs for the UE in the search spaces corresponding to the bits enabled in the bitmap.

In still another aspect, the bitmap may be sent using a separate dedicated resources in a dynamic approach, and bitmap per slot may be defined only for slots where scheduled DCI does not exist in an allocated SS.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE INVENTION

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Figure 2:
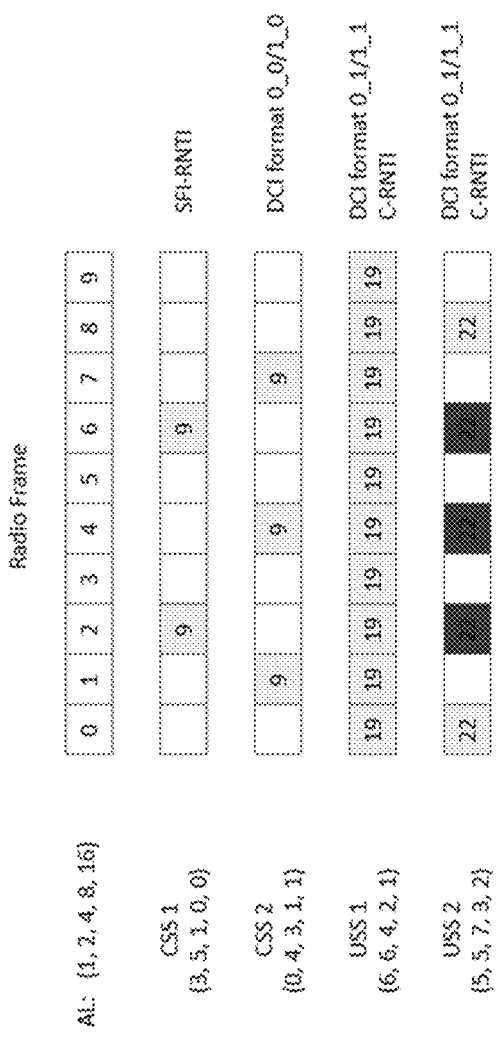
FIG. 2 illustrates number of blind decoding attempts performed by a User Equipment (UE) in a radio frame, in accordance with an embodiment of the present invention.

In one embodiment, there is dynamic indication of ALs to a UE. Generally, if a UE is configured with multiple SS sets by the BS, the UE will monitor all possible SS sets and all the candidates configured in those SS sets irrespective of its channel quality or the payload size to be monitored. As shown in FIG. 2, the UE will monitor CSS2 and USS1 in slot 1 and on all the configured ALs in both the SS sets. Therefore, on a total, (9+19) BDs need to be performed. For example, if the payload size of the DCI format to be monitored in the slot is higher than 108, then there is no need to monitor AL1 in both the SS sets because AL1 cannot carry bits higher than 108 bits. Similarly, if a UE has bad channel quality, then it is scheduled in higher ALs to satisfy the control channel PDCCH BLER.

The BS obtains the knowledge of the channel quality of the UE based on the measurement reports from the UE. Based on the channel quality, the BS can decide the subset of ALs that are most suitable for transmitting DCI. This method is applied to the UEs whose channel quality will remains constant for some time period. Along with the channel quality, the BS has the knowledge of the SS set configurations of a UE and the DCI formats that are going to be monitored in each SS set. For example, as shown in FIG. 2, for a period of 10 milli-seconds, the UE will monitor DCI formats 2_0, 0_0/1_0 and 0_1/1_1. Hence, the possible payload sizes that the UE has to monitor will be known for 10 ms. The BS selects the ALs based on the channel quality of the UE and the payload sizes the UE is going to monitor for a certain period P and indicates the selected subset of ALs to the UE. For the example shown in FIG. 2, if the BS indicates the UE to monitor only ALs 4 and 8, the number of BDs is reduced significantly. If the UE selects control channel candidates dynamically by eliminating the candidates which are not indicated by the BS to the UE, the number of BDs will reduce.

This method helps to increase the scheduling flexibility of a UE. If certain ALs are excluded for a UE, the number of blind decoding attempts in a search space decreases. Therefore, control channel candidates can be scheduled in other search spaces configured for the UE, without the problem of over booking. Hence, the control channel scheduling flexibility of a UE is improved.

This subset of the ALs to be monitored by a UE will be signalled by the BS to the UE via Radio Resource Control (RRC) signalling, or Medium Access Control (MAC) Control Element (CE), or Layer 1 (L1) signalling. The time-period associated with the selected subset is also signalled along with the information on subset of ALs.

The ALs that are needed to be monitored is indicated by using a bitmap or an index to an existing table where the table contains various combinations of ALs. A set of time period values is preconfigured to the UE and an index of the set is indicated to the UE. The BS will indicate this time period and the bitmap or index using RRC signalling or MAC-CE signalling or L1 signalling. When the UE starts using the subset configuration it also starts the timer with the corresponding time period. When the timer expires, the UE performs any one of the following actions: (i) apply the old configuration for the next time period until it gets a new configuration, (ii) the UE monitors all the ALs as configured originally, (iii) it applies a default configuration, if a separate default configuration is provided by BS, (iv) it requests BS for a new configuration. A detailed explanation of this method using a flow chart is shown in FIG. 3.

Figure 3:
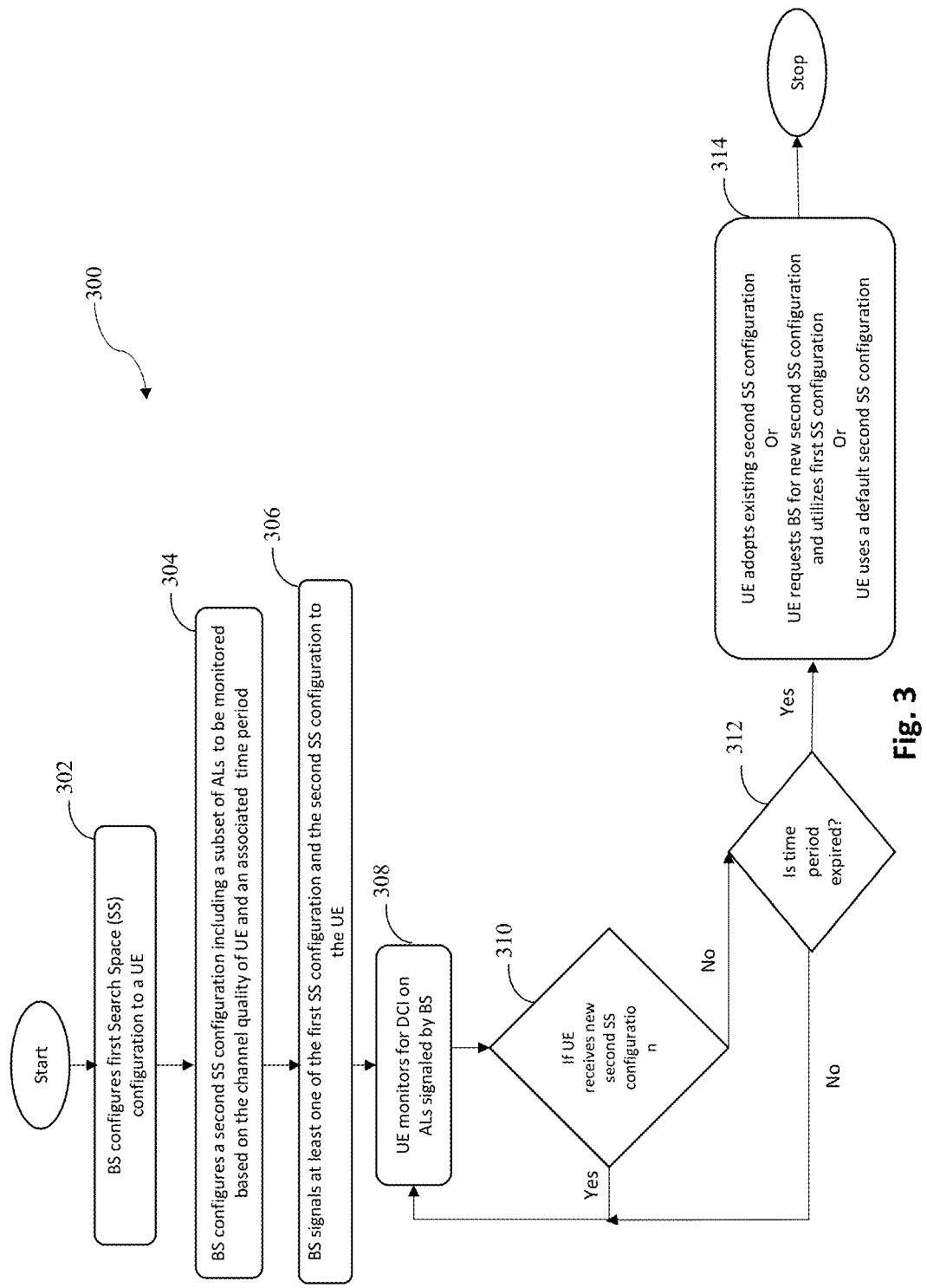
FIG. 3 illustrates flow chart showing a method of dynamic signalling of ALs to a UE, in accordance with an embodiment of the present invention.

As illustrated in FIG. 3, at step 302, the BS configures a first Search Space (SS) configuration to a UE. At step 304, the BS configures a second SS configuration. The second SS configuration may be a subset of ALs to be monitored based on a channel quality of the UE and an associated time period. At step 306, the BS signals at least one of the first SS configuration and the second SS configuration. At step 308, the UE monitors for DCI on ALs signalled by the BS. At step 310, if UE receives new second SS configuration, the method loops back to step 308 and if the UE does not receive a new second SS configuration, the method proceeds to step 312. At step 312, if time period is not expired, the method loops back to step 308 and if the time period is expired, the method proceeds to step 314. At step 314, the UE performs any one of the following: adopting existing second SS configuration, requesting BS for new second SS configuration and utilizing first SS configuration, and utilizing a default second SS configuration.

In another embodiment, there is signalling of a PDCCH multiplication factor by the BS to the UE. According to this method, a rational value "k" is signalled to the UE by the BS. The UE will modify the number of candidates in all the search spaces based on the formula given below.

Modified number of candidates per AL=floor (configured number of candidates per AL*k)

If the value of k is configured as less than one, according to the above formula, the total number of candidates will reduce per SS set which in turn will reduce the number of BDs performed in a slot.

The value of k is signalled to the UE by using any one of RRC signalling, MAC-CE signalling and L1 signalling. The BS will change the value of k according to its need. For example, when this value is configured to 0, then the UE will stop monitoring the control channel.

This value of k is associated with a time period. The BS will indicate this time period using RRC signalling or MAC-CE signalling or L1 signalling. So, the 'k' value is valid only for the specified time period. The BS will configure a new value of k based on the need and a new time period. When the timer period associated with 'k' expires, the UE performs any one of the following actions: (i) apply the old value of 'k' for the next time period until it gets a new configuration, (ii) the UE will use the originally configured number of candidates per AL without any modification done by k, (iii) it applies a default value of 'k', if a separate default value is provided by BS, (iv) it requests BS for a new configuration.

Alternatively, this value of k is also configured independently per AL. This means, a UE is configured with as many k values as there are ALs. For example, when the number of ALs is five, a UE is indicated with a set {k1, k2, k3, k4, k5}. The number of candidates per each AL is modified according to the formula: Modified number of candidates for ALi=floor (configured number of candidates for ALi*ki) by using the corresponding k value. This method provides additional flexibility by reducing the number of candidates in some selected ALs and increasing in others. This set of k values are indicated to a UE by the BS using RRC signalling or MAC-CE signalling or L1 signalling. Alternatively, a table is configured to a UE where each entry in the table contains the set {k1, k2, k3, k4, k5}. An index to this table is indicated to the UE using higher layer signalling or MAC-CE signalling or L1 signalling.

These values of k, i.e., {k1, k2, k3, k4, k5} is associated with a time period. The BS indicates this time period using RRC signalling or MAC-CE signalling or L1 signalling. Therefore, this value is valid only for the specified time period. The BS will configure new values of k based on the need and a new time period. When the timer period associated with 'ki's expires, the UE performs any one of the following actions: (i) apply the old value of 'ki's for the next time period until it gets a new configuration, (ii) the UE will use the originally configured number of candidates per AL without any modification done by 'ki's, (iii) it applies a default value of 'ki's, if a separate default value is provided by BS, (iv) it requests BS for a new configuration. A detailed explanation of this method using a flow chart is shown in FIG. 4.

Figure 4:
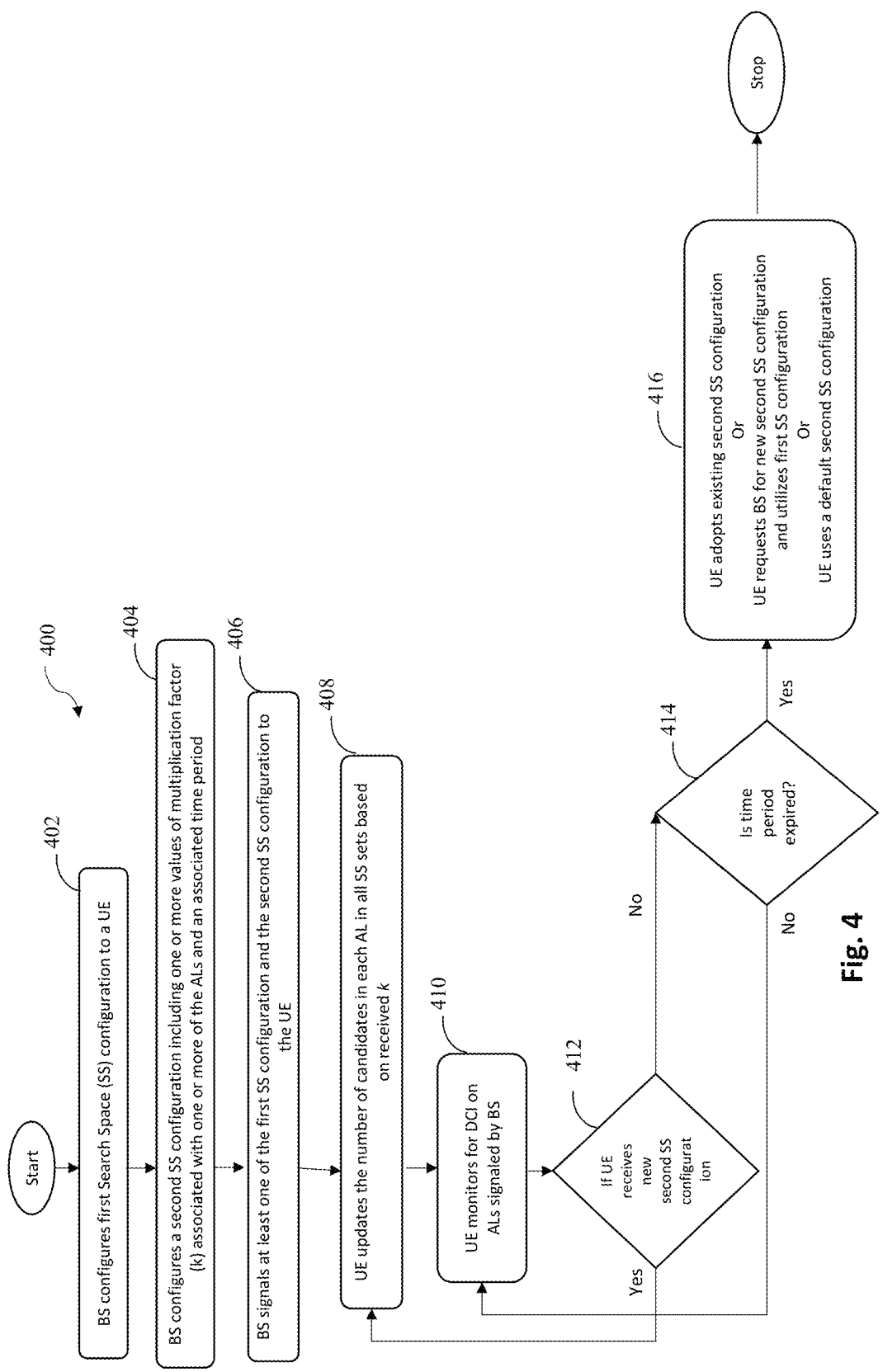
FIG. 4 illustrates flow chart showing a method of signalling multiplication factor to a UE, in accordance with an embodiment of the present invention.

As illustrated in FIG. 4, at step 402 the BS configures SS configuration to a UE. At step 404, the BS configures a second SS configuration. The second SS configuration includes a value of a multiplication factor (k) associated with one or more of ALs and an associated time period. At step 406, the BS signals any of the first SS configuration and the second SS configuration. At step 408, the UE updates the number of candidates in each AL in all SS sets based on received k. At step 410, the UE monitors for DCI, based on the updated number of candidates in each AL. At step 412, if UE receives new second SS configuration, the method loops back to step 408. At step 412, if the UE does not receive the new second SS configuration, the method proceeds to step 414. At step 414, if time period is identified to be expired, the method proceeds to step 416. If the time period is not expired, the method loops back to step 410. At step 416 UE performs any one of the following: adopting existing second SS configuration, requesting BS for new second SS configuration and utilizing first SS configuration, and utilizing a default second SS configuration.

Figure 1B:
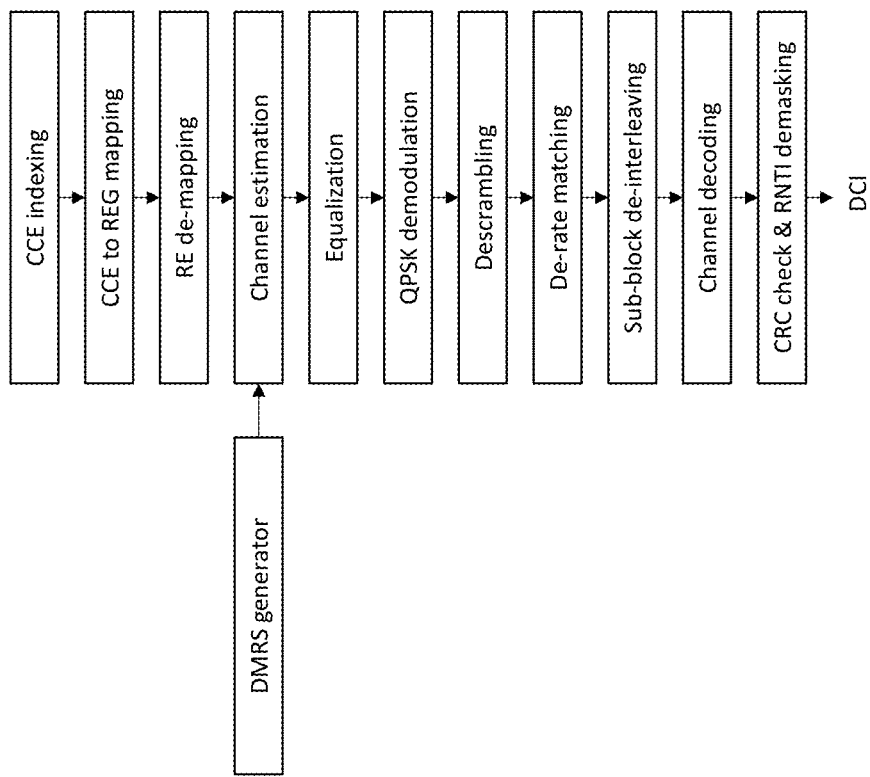
FIGS. 1a and 1b illustrate the Physical Downlink Control Channel (PDCCH) transmitter and receiver block diagrams respectively, in accordance with an embodiment of the present invention.
Figure 1A:
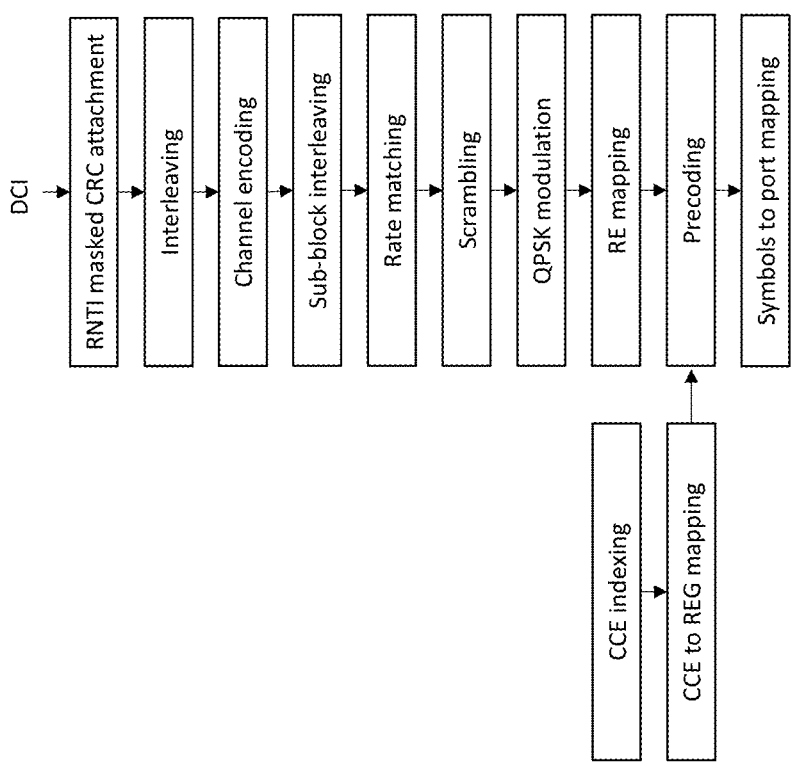

In another embodiment, there is indication to a UE which type of SS set to monitor in a slot. In this method, the BS will signal the UE as to whether to monitor only CSS or only USS or both CSS and USS or neither CSS nor USS in a slot. This signalling will apply to the SS sets configured to a UE. If in a slot, a UE is signalled by the BS to monitor only CSS, the UE will perform BDs only in the SS sets that are configured as CSS. If it is signalled to monitor only USS, the UE will perform BDs only in the SS sets that are configured as USS. If it is signalled to monitor both CSS and USS, the UE will monitor in all the SS sets. If it is configured not to monitor both in CSS and USS, the UE won't perform BD in that slot. For example, consider FIG. 1 wherein in slot 4, UE needs to monitor CSS2, USS1 and USS2. If the gNB indicates that the UE needs to monitor only CSS in slot 4, the UE has to monitor in CSS2 only. This leads to considerable decrease in the number of BDs. A UE is signalled with a time period P and each slot within the time period is signalled with the above-mentioned configuration. Two bits are required per slot as there are four types of configurations available. Hence, if the time period P has N slots, then 2N bits are required for the configuration. This configuration and the associated time period can be signalled to the UE by the BS using RRC signalling or MAC-CE signalling or L1 signalling.

If a UE receives a new configuration before the time period expires, the UE will update its configuration according to the received signalling This configuration and the associated time period can be signalled to the UE by the BS using RRC signalling or MAC-CE signalling or L1 signalling, the UE performs any one of the following actions: (i) apply the old configuration for the next time period until it gets a new configuration, (ii) the UE will monitor all the SS sets by considering the default configuration as both CSS and USS, (iii) it applies a default configuration, if a separate default configuration is provided by BS, (iv) it requests BS for a new configuration. A detailed explanation of this method using a flow chart is shown in FIG. 5.

Figure 5:
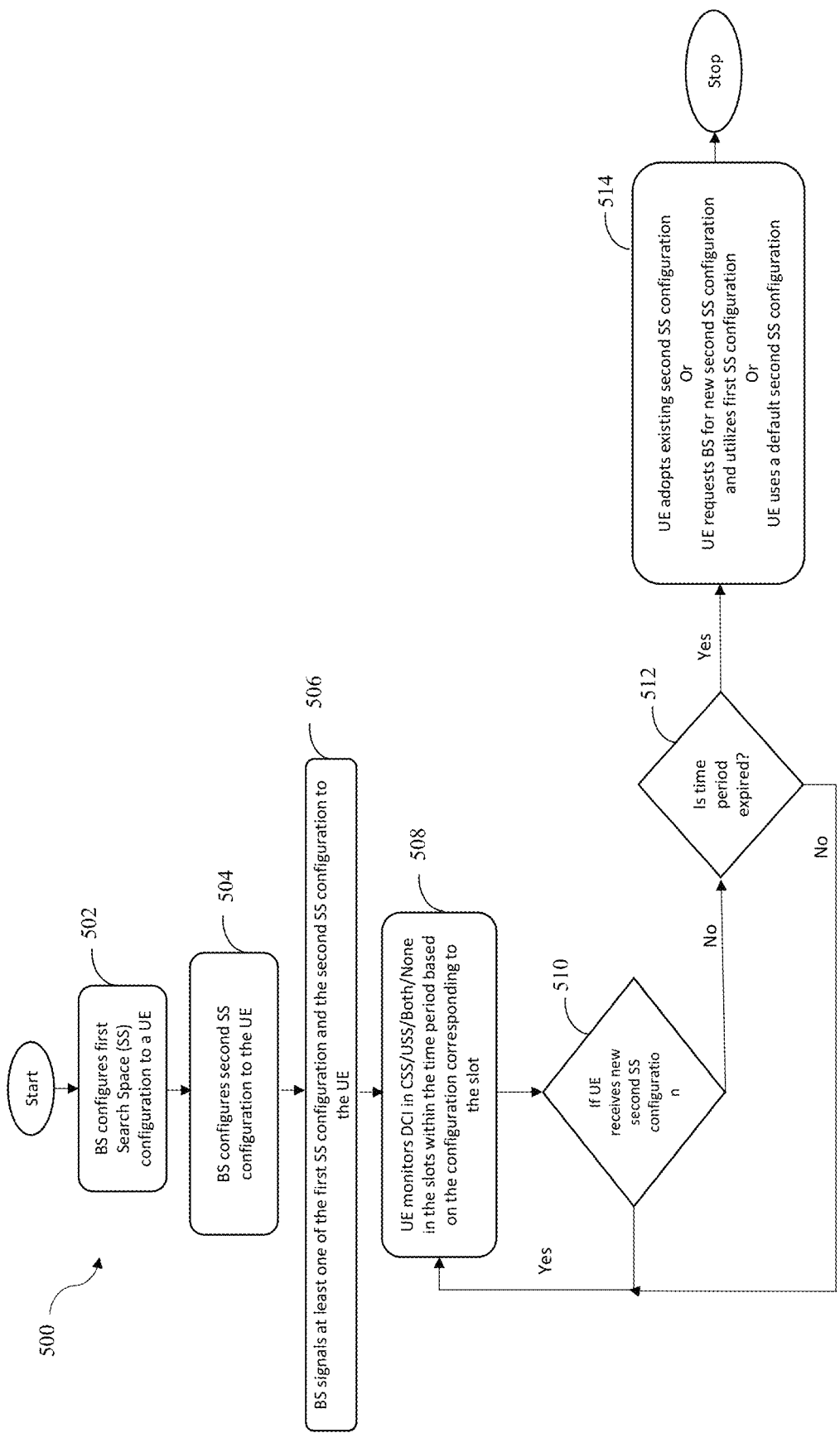
FIG. 5 illustrates flow chart showing a method of indicating, the type of Search Space (SS) set to be monitored in a slot to a UE, in accordance with an embodiment of the present invention.

As illustrated in FIG. 5, at step 502 the BS configures a first search space configuration to a UE. At step 504, the BS configures a second search space configuration to the UE. The second SS configuration is type of SS to be one of monitored and not monitored for each slot in a given time period. At step 506, the BS signals the at least one of the first search space configuration and the second search space configuration to the UE. At step 508, the UE monitors for Downlink Control Information (DCI) in CS S/US S/Both/ None in the slots within the time period based on the configuration corresponding to the slot. At step 510, if UE receives new second search space configuration, the method loops back to step 508. If UE does not receive new configuration, then the method proceeds to step 512. At step 512, if time period is not expired, the method loops back to step 508. If time period is expired, the method proceeds to step 514. At step 514, the UE performs blind decoding by one of utilizing a default second SS configuration, adopting the existing second SS configuration, requesting the BS for a new second SS configuration and utilizing the first SS configuration when the new second SS configuration is not received by the UE before the timer expires.

In another embodiment, there is concatenation of DCI payloads. This method is used when a UE is scheduled with multiple DCIs in the same slot frequently. The BS will indicate the UE to monitor for a concatenated DCI payload in a slot. The concatenation applies only to DCI formats that schedules data transmission. When a BS schedules a UE with multiple DCIs that schedules DL/UL data reception or transmission and among those multiple DCIs if some of the DCI's belong to same DCI format and same RNTI, the BS concatenates those DCIs (of same format and RNTI) and transmits to a UE. The UE is informed about the concatenation via RRC signalling or MAC-CE signalling or L1 signalling. For example, if a UE receives a configuration from the BS to monitor for 'c' concatenated DCI payloads for DCI formats 0_1/1_1, then the UE will monitor for the concatenated DCI payload. After receiving the concatenated payload, the UE will stop further monitoring. To maintain the BLER of the control channel, the size of the ALs is increased proportionately according to c i.e., aggregation level L becomes aggregation level cL. If the size of the modified AL crosses the size of the CORESET, then UE will not monitor in that AL.

An associated time period also will be indicated to the UE. The configuration given to the UE will be applied for the time period specified. This value of c and the associated time period are signalled to the UE using RRC signalling or MAC-CE signalling or L1 signalling. When the time period expires, the UE performs any one of the following actions: (i) apply the old configuration for the next time period until it gets a new configuration, (ii) the UE will go back to the original configuration, i.e., monitoring without concatenation, (iii) it applies a default configuration, if a separate default configuration is provided by BS, (iv) it requests BS for a new configuration. This concatenation signalling is applied only to the USS.

Alternatively, it is implemented in a way, whereas each USS is configured with a c value. The UE will monitor a USS for the concatenated payload of c DCIs. The USS that are configured with higher value of c will be monitored first i.e., the USSs are monitored in the descending order of c. The ALs for each USS will be increased by the factor of c i.e., AL of L becomes cL. The UE will stop further monitoring if the UE receives a concatenated payload. A detailed explanation of this method using a flow chart is shown in FIG. 6.

Figure 6:
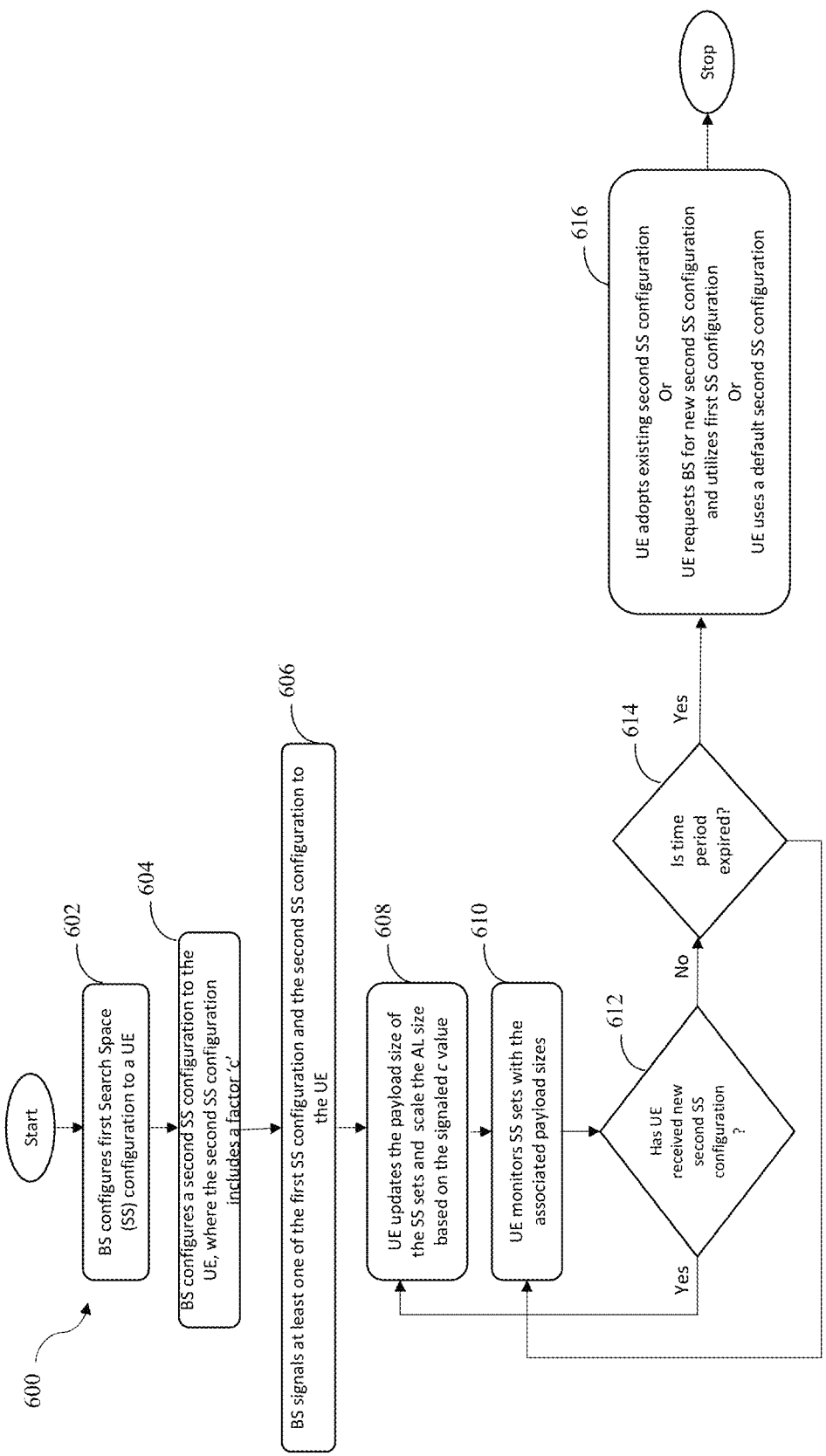
FIG. 6 illustrates flow chart showing a method of concatenating DCI payloads, in accordance with an embodiment of the present invention.

As illustrated in FIG. 6, at step 602, the BS configures a first Search Space (SS) configuration to a UE. At step 604, the BS configures a second SS configuration to the UE. The second SS configuration is at least one multiplication factor (c) for at least one SS set and an associated time period. At step 606, the BS signals at least one of the first SS configuration and the second SS configuration to the UE. At step 608, the UE updates the payload size of the SS sets and scale the AL size based on the signalled c value. At step 610, UE monitors c concatenated DCIs in the SS sets with the associated payload sizes and AL size. The concatenated DCIs belong to one of the same format and same Radio Network Temporary Identifier (RNTI). At step 612, if UE receives a new second SS configuration, the method loops back to step 608. If UE does not receive new configuration, the method proceeds to step 614. At step 614, if time period is not expired, the method loops back to step 610. If time period is expired, the method proceeds to step 616. At step 616, UE performs blind decoding by one of utilizing a default second SS configuration, adopting the existing second SS configuration, requesting the BS for a new second SS configuration and utilizing the first SS configuration when the new second SS configuration is not received by the UE before the timer expires.

In another embodiment, there is DCI for different process/carriers in PDSCH in carrier aggregation. In case of carrier aggregation, cross carrier scheduling can be employed where DCIs of secondary carriers are also carried in the control channel of the primary carrier. The DCIs of secondary carriers are associated with a carrier indicator. The UE has to perform blind decoding for all the DCIs present in the control channel of the primary carrier, which is power consuming. In order to reduce the number of blind decoding due to the DCI of the secondary carriers, the following method can be employed. In this method, the first DCI schedules the data channel for a process (primary carrier). This first DCI is monitored is decoded using BD. The DCIs to schedule the data channel(s) for other process (secondary carriers) will be transmitted in the data channel scheduled by first DCI. This would reduce the number of BDs because the UE doesn't have to monitor for other DCIs in the control channel of first process (primary carrier). A flag "DCIpresentInData" will be sent in DCI present in control channel indicating that other DCIs for secondary carriers are present in data channel and to stop further monitoring.

An alternate way is to transmit the subsequent DCI for every new process in data channel of previous process. For example, data region 1 carries DCI 2 for carrier 2, data region 2 carries DCI 3 for carrier 3 and so on. In this case, one-bit flag is included at the end of DCI to indicate that further or next DCI is in corresponding data channel of current DCI. This flag is set to 0 in case of no further DCIs or alternatively, this flag is set to 1 in case of no further DCIs.

DCI bits for secondary carriers will be padded at the start of primary carrier's data channel before data bits. The number of DCI bits and the formats of different DCIs will be informed to UE in two ways. One way is to include a UE specific field in DCI within control channel of the primary along with stop flag indicator. This field indicates the number of DCIs and the formats of DCIs. Another way is to include the information at start of DCI payload part in data region like a header, so that the UE will receive the information about numbers and formats of DCIs included at the start of data region. The UE will use the information on the formats and number of DCIs to segregate between various DCIs and to segregate data bits from DCI bits. For the region in data channel containing DCIs, a lower modulation scheme and/or coding rate to meet a target BLER (for example $<10^{-4}$) is used to increase the reliability for the control information transmission.

In addition to reducing the number of BDs for a UE, this method will also increase the scheduling capacity of the network because there will be more free search spaces as DCIs for the UE is present in data region of primary. Hence these free locations in search spaces is given to control channel candidates of additional users scheduled, thus in this way more number UEs can be scheduled at a time by gNB. A detailed explanation of this method using a flow chart is shown in FIG. 7.

Figure 7:
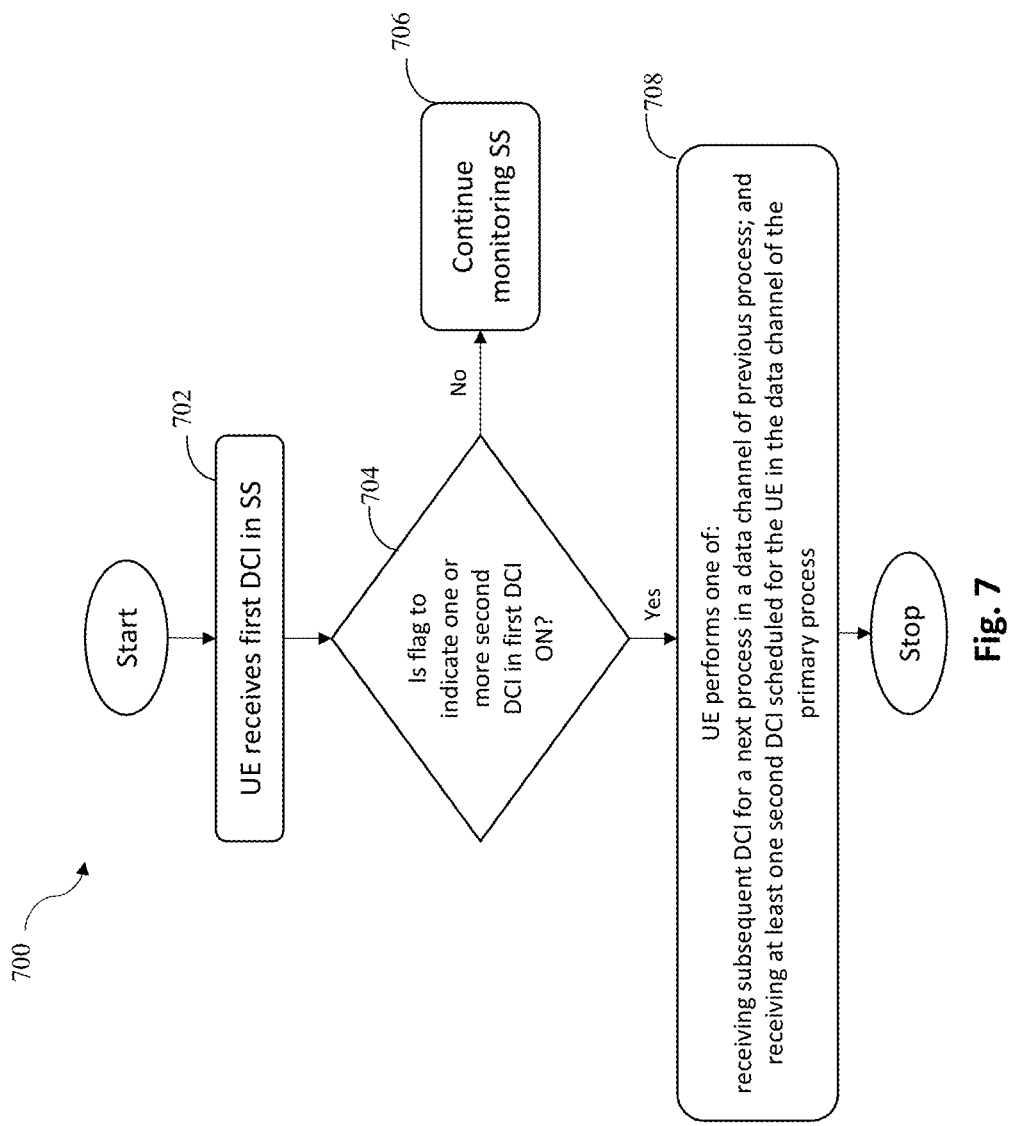
FIG. 7 illustrates flow chart showing a method of transmitting DCI for different process/carriers in PDSCH in CA, in accordance with an embodiment of the present invention.

As illustrated in FIG. 7, at step 702, a first DCI is sent in SS. At step 704, if flag to indicate at least one second DCI is present in data channel is enabled in the first DCI, the method proceeds to step 708. If flag in first DCI is not on, the method proceeds to step 706. At step 706, monitoring of the SS for the second DCI is continued. At step 708, UE performs one of receiving subsequent DCI for a next process in a data channel of previous process and receiving at least one second DCI scheduled for the UE in the data channel of the primary process.

In one embodiment, a limit may be imposed on number of DCIs UE can receive in one format in a period of time. In this method, the BS will impose a limit on every DCI format in a time period so that the UE does not monitor for that format within the time period, once the limit has crossed. This limit is configured by the BS to the UE for all DCI formats or specified DCI formats. For example, if a UE is configured by the BS that the maximum number of DCIs it can receive in DCI format 0_0/1_0 is 3 for a time period of 10 ms, then the UE will stop monitoring in the SS sets that are configured to monitor for DCI format 0_0/1_0 after it has received 3 DCIs in the corresponding time window. The UE again will start monitoring for the DCI format 0_0/1_0 after the end of the time period, i.e., 10 ms. The BS can reconfigure the limit on each DCI format and the time period associated with it according to the need for a specific DCI format by a particular UE. This configuration is signalled to the UE by the BS using RRC signalling or MAC-CE signalling or L1 signalling or combination of both. A detailed explanation of this method using a flow chart is shown in FIG. 8.

Figure 8:
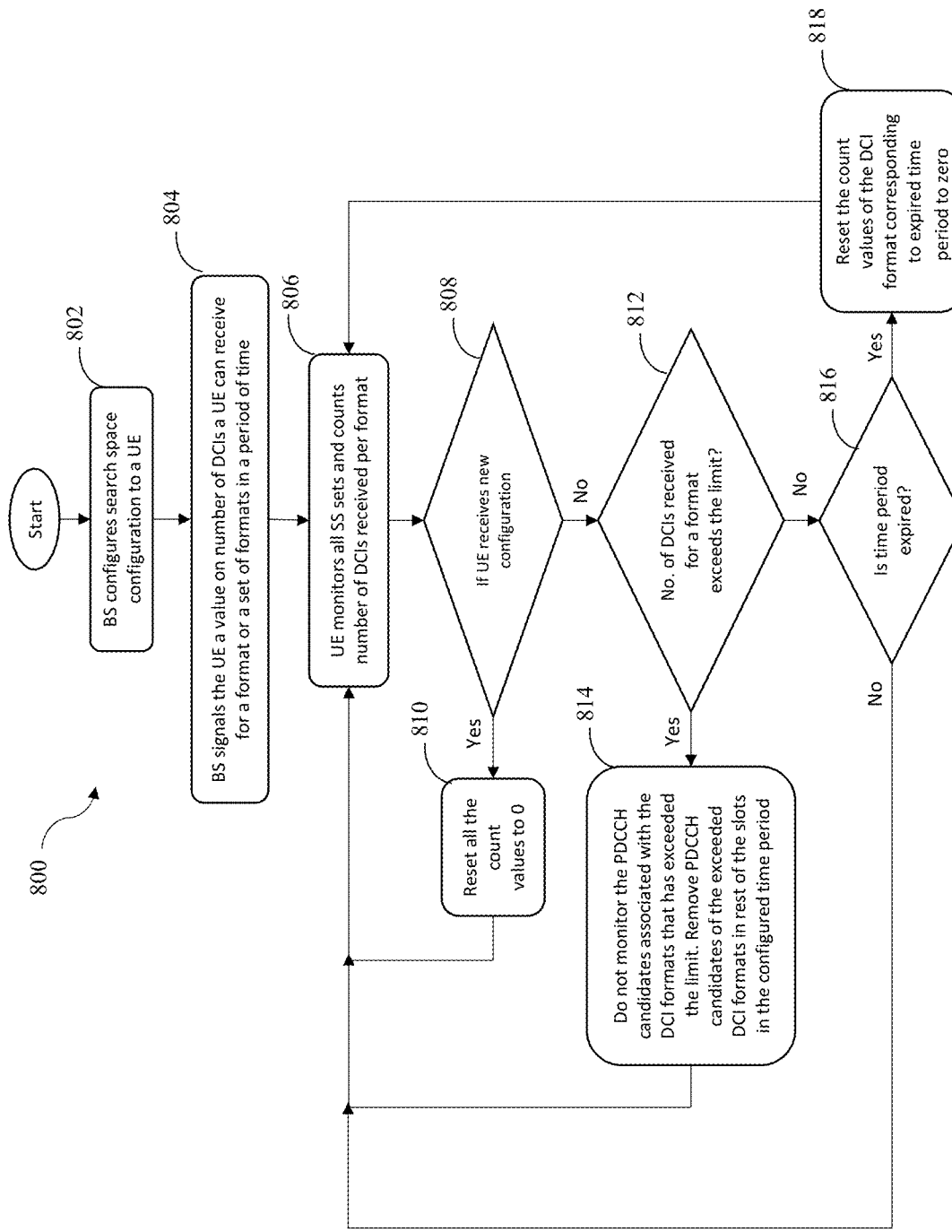
FIG. 8 illustrates flow chart showing a method of imposing limit on the number of receivable DCI formats by a UE, in accordance with an embodiment of the present invention.

As illustrated in FIG. 8, at step 802 the BS configures search space configuration to a UE. At step 804, the BS signals the UE a value on number of DCIs a UE can receive for a format or a set of formats in a period of time. At step 806, UE monitors all SS sets and counts number of DCIs received per format. At step 808, it is determined if the UE has received new configuration. If it is identified that the UE has received new configuration, the method proceeds to step 810. At step 810, all the count values are reset to 0 and control is transferred back at step 806. At step 808, if the UE does not receive new configuration, the method proceeds to step 812. At step 812, it is determined if the number of DCIs received for a format exceeds the limit. If it is identified that the number of DCIs received for a format is exceeding the limit, the method proceeds to step 814. At step 814, the PDCCH candidates associated with the DCI formats that has exceeded the limit are not monitored, and PDCCH candidates corresponding to the DCI formats whose count has exceeded are removed in rest of the slots in the configured time period. At step 812, if the number of DCIs received for a format are identified to not exceed the limit, the method proceeds to step 816. At step 816, it is determined if time period has expired. When it is identified that the time period has expired, the method proceeds to step 818. At step 818, the count values of the DCI format corresponding to expired time period are reset to zero and control is transferred back at step 806. At step 816, if time period is not expired, the method loops back to step 806.

In one embodiment, there is Indication to stop doing BD. This method is applicable for the case where the UE performs blind decoding in some predefined order. The mapping of the control channel candidates will follow the order of CSS first and USS later i.e., the candidates from all the CSSs are fixed as valid candidates and the candidates from the USS are taken in the ascending order of the SS ID. Hence, BS will have the knowledge of what are the possible SS sets the UE will monitor on. This method is based on the BS knowledge on which SS sets the UE is going to monitor for PDCCH.

Consider an example where a UE will monitor for 5 USS in a slot with SS ids 1, 2, 3, 4 and 5 referred to as USS 1, USS 2, USS 3, USS 4 and USS 5 respectively. It is assumed that a DCI is scheduled in USS 1 and one DCI is scheduled in USS 2 in the slot. According to the current NR standards, the UE will monitor all the valid control channel candidates i.e., the UE will monitor all the USS in the slot. But in the example given above, the UE need not monitor in USS 3, 4 and 5. However, the UE will not stop monitoring in these USSs because there is no indication for the UE that says no DCI is present in USS 3, 4 and 5. Hence, the BDs performed by the UE in USS 3, 4 and 5 leads to wastage of power.

In order to mitigate this problem, in the proposed method, the BS includes an indication field in the DCI which informs the UE whether to stop doing BDs or continue doing BDs. This indication will be a one-bit field that will be present in the DCI. This bit is present in all the DCIs that are being transmitted in the USSs. If the bit field is set to 0 in a DCI that is received in the USS with index i, then the UE will not perform BDs in the SS sets with index greater than i, else, the UE does BDs in SS sets with index greater than index i. In this case, the BS will set the bit to 0 in the DCI that is scheduled in the SS set with the highest index. In the DCIs that are scheduled in all other SS sets, this field is set to 1. Alternatively, if the bit field is set to 1 in a DCI that is received in the USS with index i, then the UE will not perform BDs in the SS sets with index greater than i, else, the UE does BDs in SS sets with index greater than index i. In this case, the BS will set the bit to 1 in the DCI that is scheduled in the SS set with the highest index. In the DCIs that are scheduled in all other SS sets, this field is set to 0.

In the above example, the DCIs are scheduled in USS 1 and 2 and no DCI is scheduled in USS 3, 4 and 5. According to the given method, the indication bit will be disabled (for example by setting to 0) in the DCI scheduled in USS 1, and, the indication bit will be enabled (for example by setting to 1) in the DCI scheduled in USS 2. Hence, the UE will stop monitoring in the USS 3, 4 and 5 thus saving the power. A detailed explanation of this method using a flow chart is shown in FIG. 9.

Figure 9:
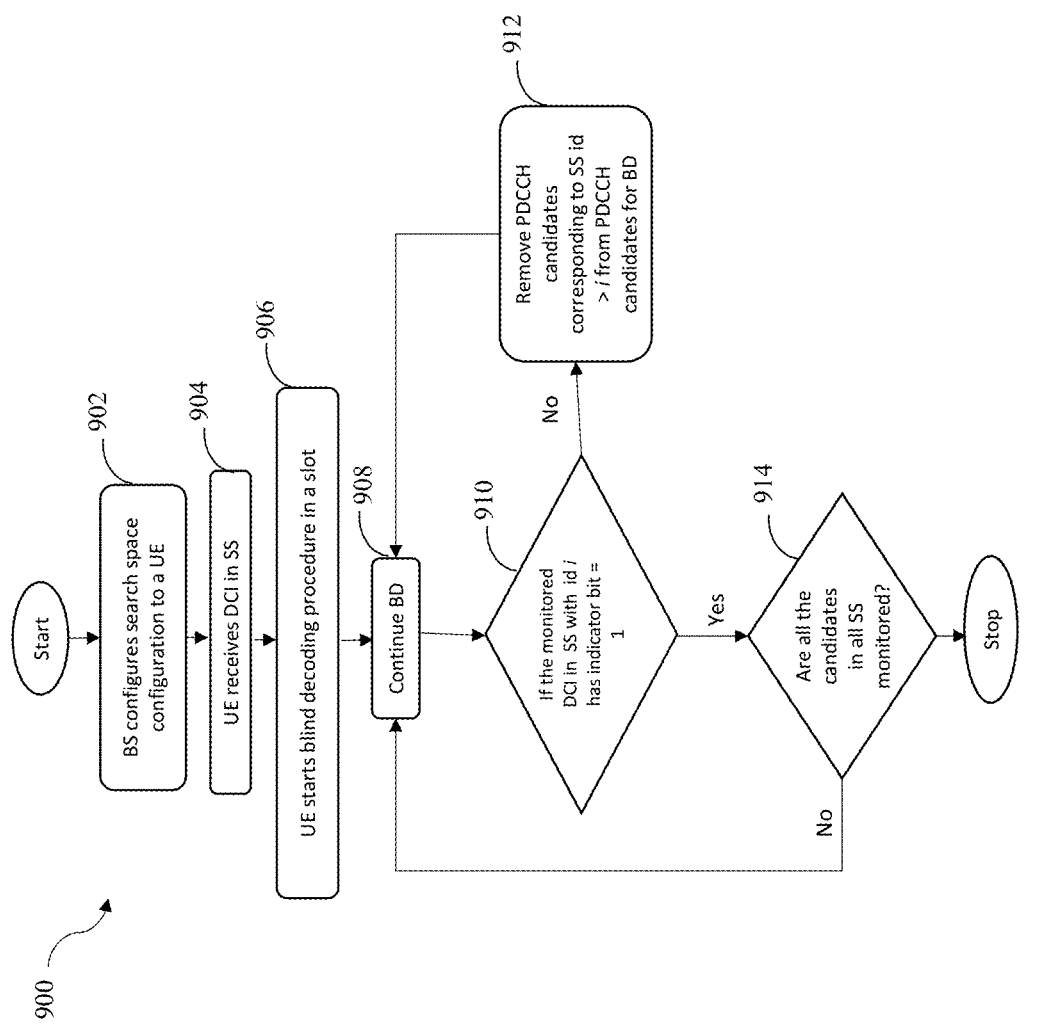
FIG. 9 illustrates flow chart showing a method of sending an indication bit to the UE, in accordance with an embodiment of the present invention.

As illustrated in FIG. 9, at step 902 the BS configures Search Space (SS) configuration to a UE. At step 904, the UE receives a Downlink Control Information (DCI) in a Search Space (SS) sent by the BS. At step 906, UE starts blind decoding procedure in a slot. At step 908, BD is continued. At step 910, if the monitored DCI in SS with id "i" has indicator bit=1, the method proceeds to step 914. If the monitored DCI in SS with id "i" does not have indicator bit=1, the method proceeds to step 912. At step 912, PDCCH candidates corresponding to SS id>i are removed from PDCCH candidates for blind decoding. At step 914, if all the candidates (in all SS) are not monitored, the method loops back to step 908.

As an alternative, the total number of DCIs present in a search space is indicated in all DCIs of the search space. This is done for all search spaces individually. This will provide the user an idea about number of DCIs present in each search space. For e.g., let N represent the number of DCIs scheduled in a particular search space and the number 'N' is indicated in all DCIs in that search space. After receiving the Nth DCI of the search space, UE will skip the blind decoding for the remaining part of current search space and start monitoring the next search space. Therefore, this information reduces unnecessary blind decoding attempts and saves power. This method does not require that DCIs should be received in any order. The BS will append this information anywhere in the DCI. The number of bits required to indicate this information depends on the number of DCIs that can be scheduled to a UE in a search space. If a UE can be scheduled with N DCIs in a search space, then ceil(log 2N) are required to indicate this signalling. A detailed explanation of this method using a flow chart is shown in FIG. 10.

Figure 10:
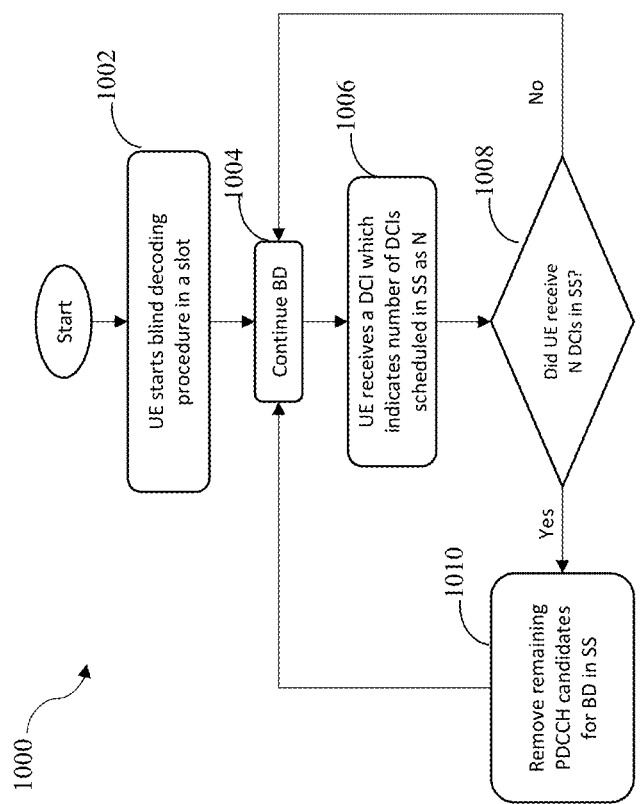
FIG. 10 illustrates flow chart showing a method of indicating number of DCIs scheduled in a search space to the UE, in accordance with an embodiment of the present invention.

As illustrated in FIG. 10, at step 1002, UE starts blind decoding procedure in a slot. At step 1004, blind decoding procedure is continued. At step 1006, UE receives a DCI which indicates number of DCIs scheduled in a SS as N. At step 1008, if UE receives N DCIs in the SS, the method proceeds to step 1010. At step 1010, remaining Physical Downlink Control Channel (PDCCH) candidates for blind decoding present in the SS are removed, and then blind decoding procedure is resumed in other SS, at step 1004. At step 1008, if the UE does not receive N DCIs in the SS, the method loops back to step 1004.

In order to reduce number of BD attempts made by a UE to receive DCI, a BS will indicate the total number of DCIs scheduled for a UE in the slot, in every DCI. When a UE receives a DCI, which indicates the UE that it is scheduled with N DCIs in that slot, then UE will stop doing blind decoding after receiving all the N DCIs. This method does not assume that DCIs are received in any order. The BS can append this information anywhere in the DCI. The number of bits required to indicate this information depends on the number of DCIs that can be scheduled to a UE in a slot in a component carrier. If a UE is scheduled with N DCIs per slot per component carrier, then $\lceil \lfloor \log \rfloor_2 N \rceil$ are required to indicate this signalling. A detailed explanation of this method using a flow chart is shown in FIG. 11.

Figure 11:
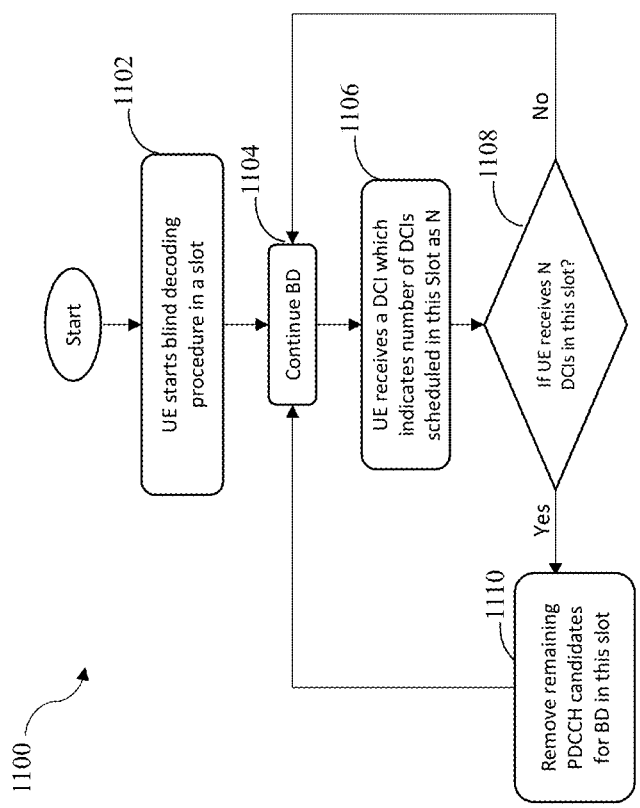
FIG. 11 illustrates flow chart showing a method of indicating number of DCIs scheduled in a slot to the UE, in accordance with an embodiment of the present invention.

As illustrated in FIG. 11, at step 1102, UE starts blind decoding procedure in a slot. At step 1104, blind decoding procedure is continued. At step 1106, UE receives a DCI which indicates number of DCIs scheduled in a Slot as N. At step 1108, if UE receives N DCIs in this slot, the method proceeds to step 1110. At step 1110, the remaining PDCCH candidates for blind decoding present in this slot are removed and then blind decoding procedure is resumed in other slot, at step 1104. At step 1108, if UE does not receive N DCIs in this slot, the method loops back to step 1104.

The above two alternatives i.e., indicating number of DCIs per search space and indicating number of DCIs per slot, are applied only for DCI that schedules unicast data transmission or reception.

In one embodiment, there is bitmap indication of search spaces to be monitored to reduce number of blind decoding attempts. When a UE is configured with multiple SS, there can be scenario where there is no DCI for the UE in some of the search spaces in certain slot. However, in any slot, UE will perform BDs on all the SS that are applicable for that slot based on the periodicity and offset. This leads to wastage of power. For e.g., in FIG. 2, there are 4 search spaces configured to a UE as CSS 1, USS 1, CSS 2 & USS 2 with different periodicity for each search space. As per the diagram, in slot 2, the UE needs to monitor CSS1 based on the periodicity and offset of CSS 1. However, if the BS is not planning to send any DCI in CSS 1 in slot 2, the BDs performed by UE on CSS 1 in slot 2 are unnecessary. In case of more search spaces configured to UE (a maximum of 10 search spaces configured for a UE), there will be more number of unnecessary blind decoding attempts. In this method, a bitmap of size equal to the number of configured search space to the UE is provided to the UE.

The bitmap contains ones in bits corresponding to the search spaces that may contain DCI for that UE and zeros in other bits. This bitmap indicates the presence of DCI in the search spaces and will be informed to the UE, so that the UE knows which search spaces are to be monitored.

The BS will take into consideration of parameters like the traffic of the UE, previous scheduling patterns for the UE, number of UEs in the cell, channel quality of the UE, compromise in scheduling flexibility etc. before deciding the bitmap. The bitmap is informed to the UE directly or an index to a table containing all combinations of configured search spaces is given. The table will be formed by the UE based on search space configuration given by RRC messages.

The bitmap indication is done in two ways, semi periodic and dynamic. In semi periodic approach, a bitmap is configured for a time period before scheduling and the BS will allocate the DCIs to the UE as per the bitmap. This bitmap is indicated to the UE by RRC message, MAC CE or DCI. The UE performs BD according to the bitmap until the timer expires. Once the time period of the bitmap ends, the UE will start monitoring all the search space as usual until it receives a new bitmap. After receiving the new bitmap, UE follows bitmap pattern for monitoring further, thus saving power.

Using RRC signalling: This bitmap signalling should be of higher periodicity than the RRC message containing the configuration of the search spaces and ALs. Using DCI: This bitmap is indicated through DCI and be associated with a timer. Here, the bitmap is transmitted in advance to the UE. i.e., signalling is provided before (n-j)th slot for the scheduling to be done on nth slot, where j is the time when BS decides to schedule.

In dynamic approach, the BS schedules and knows the exact SS where the DCI for the UE is present. Hence a bitmap per slot is defined only for slots where there is no scheduled DCI in allocated search space. Here the bitmap indication is done dynamically and for each slot independently using a separate dedicated channel. There are fixed RBs in a specific region in the BWP. The gNB (alternatively referred as BS) fills those RBs with the bitmap. The UE will decode those RBs first, get the bitmap and perform BD according to the bitmap. For e.g., in FIG. 2, gNB sends a 4-bit bitmap to the UE indicating which search space to be monitored. For slot 2, the bitmap will be 0011, hence the UE knows that it has to monitor only in USS 1 & USS 2. This will avoid unnecessary monitoring of search spaces. A detailed explanation of this method using a flow chart is shown in FIG. 12.

Figure 12:
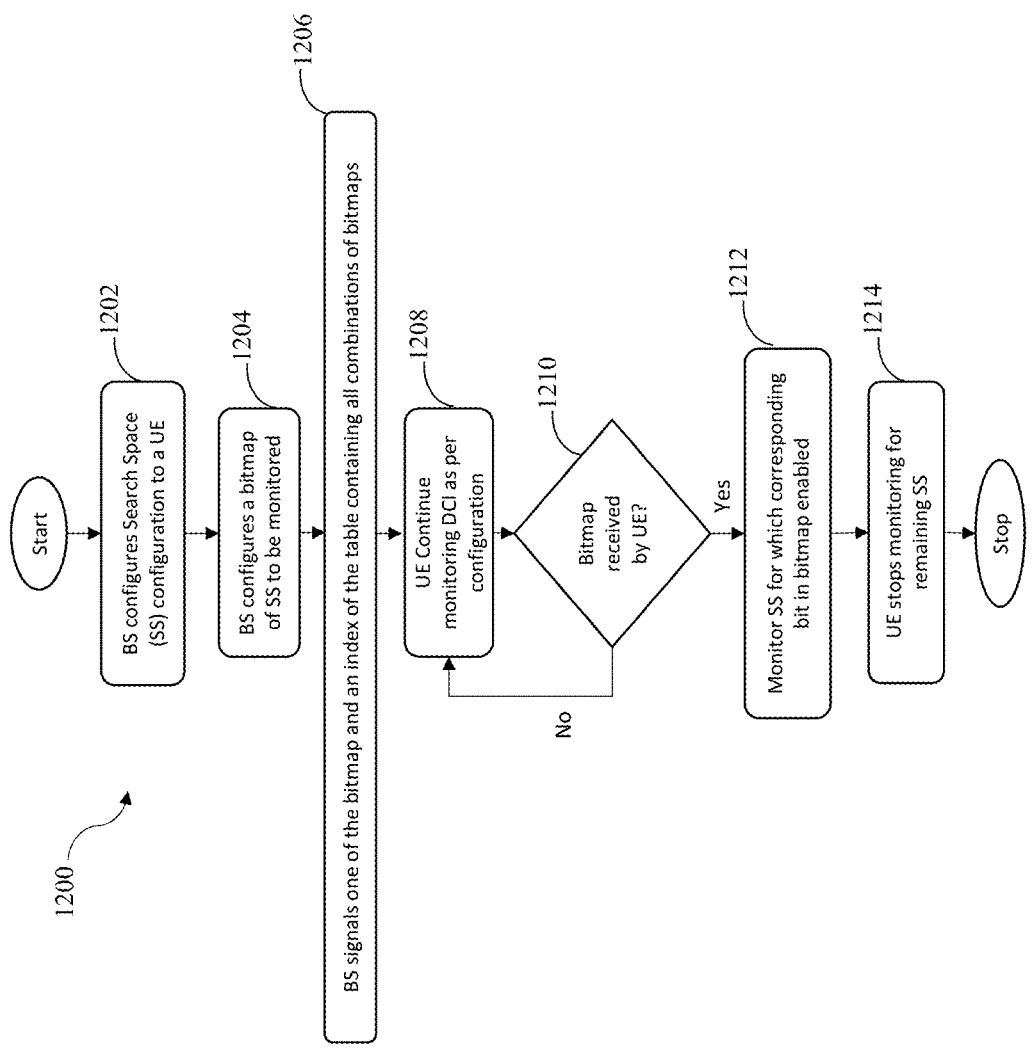
FIG. 12 illustrates flow chart showing a method of bitmap indication of SS sets to be monitored, in accordance with an embodiment of the present invention.

As illustrated in FIG. 12, at step 1202 the BS configures Search Space (SS) configuration to a UE. At step 1204, the BS configures a bitmap of SS to be monitored by the UE. At step 1206, the BS signals one of the bitmap and an index of the table containing all combinations of bitmaps. At step 1208, the UE continues monitoring of DCI as per configuration till the bitmap/index is received from the BS. At step 1210, if UE receives new bitmap/index, then the method proceeds to step 1212. If UE does not receive new bitmap/index, then the method loops back to step 1208. At step 1212, SS is monitored for which corresponding bit in bitmap is enabled.

At step 1214, UE stops monitoring for remaining SS.

In one embodiment, there is prior transmission of high priority DCI. If multiple DCIs with different priority levels are configured to a UE by the BS, there can be vacant search spaces between the DCIs. Also, there can be low priority DCI present in between two high priority DCIs. Hence to get all high priority DCIs, UE has to do blind decoding for all search space including SS containing low priority DCIs. In order to avoid this, the BS schedules all high priority DCIs first and then schedule low priority DCIs in search spaces. The final high priority DCI contains an indicator at the end to indicate the end of high priority DCIs, UE will stop monitoring further after receiving this indicator field if it can afford to lose low priority DCIs. It will be a one-bit indication if the DCI is present in USS.

For the DCI present in CSS, the indication will be done using a dedicated field included in CSS. This field can be a bitmap for the group of users receiving the CSS. For the stop message indicating end of high priority DCIs to any user the corresponding bit will be one. Alternatively, the field can be a user indicator dedicated to a particular user containing the UE index. This user indicator will be included for all users receiving CSS in a similar manner. In this way after receiving all important DCIs, UE stops BD and hence enable low power consumption. A detailed explanation of this method using a flow chart is shown in FIG. 13.

Figure 13:
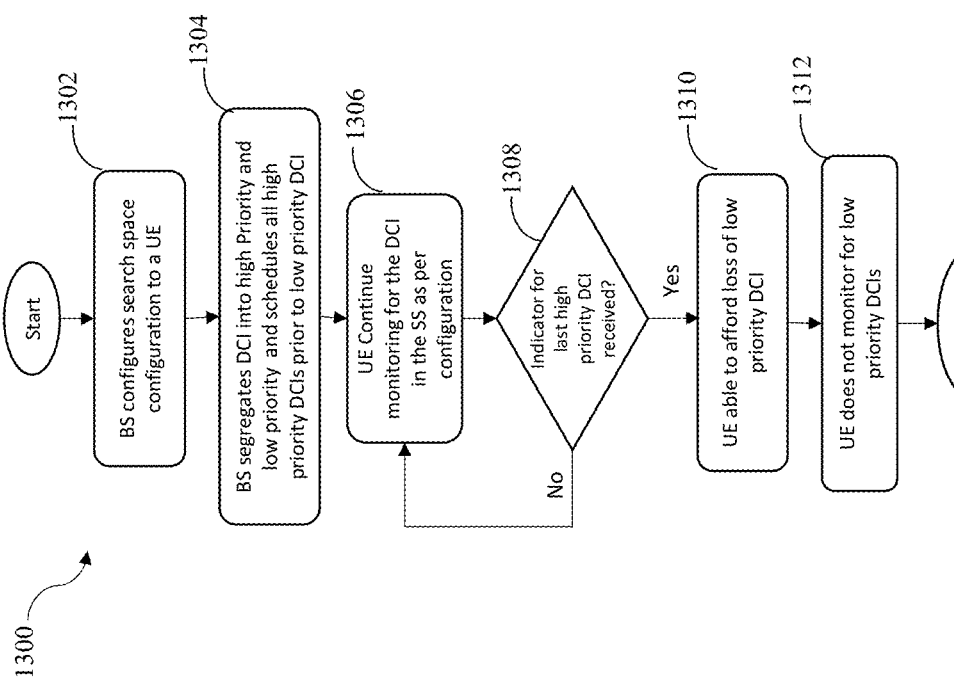
FIG. 13 illustrates flow chart showing a method of prior transmission of high priority DCI, in accordance with an embodiment of the present invention.

As illustrated in FIG. 13, at step 1302 the BS configures search space configuration to a UE. At step 1304, the BS segregates the scheduled DCI into high priority and low priority DCIs and schedules all high priority DCIs prior to low priority DCI. At step 1306, the UE continue monitoring for the DCI in the SS, as per configuration. At step 1308, if Indicator for last DCI with high priority is received, then the method proceeds to step 1310, else, when the UE does not receive indicator for last DCI with high priority, the method loops back to step 1306. At step 1310, UE will be able to afford loss of low priority DCI. At step 1312, UE does not monitor for low priority DCIs.

Figure 14:
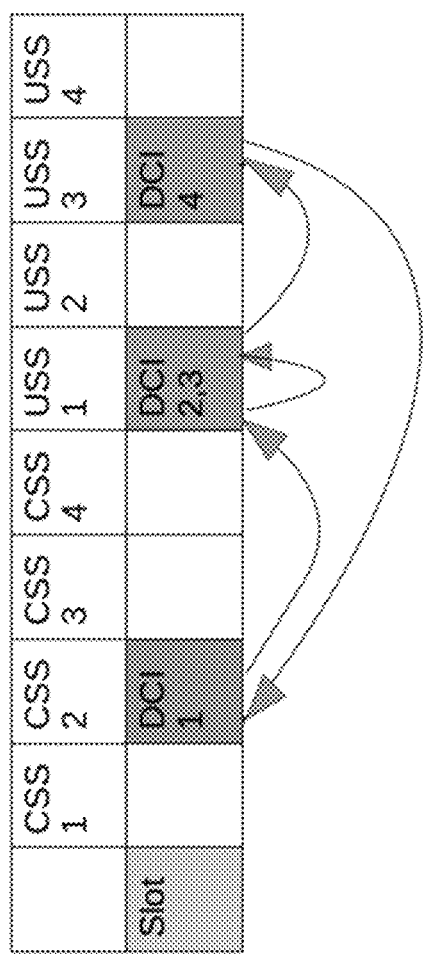
FIG. 14 illustrates SS locations in DCIs, in accordance with an embodiment of the present invention.

In one embodiment, there is SS location of next DCI in previous. In this method, each DCI contains the information about location of the search space of the next DCI in a round robin way. This method does not assume that UE performs monitoring in any specific order. Even if the UE does not perform BD in any order, whenever any DCI is decoded, the information about the search space of another DCI is obtained and so on. A separate field for indication of next SS to be monitored will be included in DCI. For the DCIs coming in CSS, indication is done separately for each UE. The indicator field per user contains UE index and the SS index of the next DCI for that UE. This will be done individually within the DCI for all UEs receiving that DCI. In USS, this per user indicator field will be disabled and only the SS index will be included. For example, DCI 1 contains SS location of DCI 2 and so on and the last DCI (DCI N) contains SS location of first DCI (DCI 1) as shown in FIG. 14. In this method, when the SS index of the next DCI is indicated in a DCI, the UE performs BD and obtains all the DCIs present in that SS. UE will not monitor if it gets that SS index again in any other DCI. For example, in FIG. 14, DCI 1 contains indication of USS 1 hence once DCI 1 is received, UE will go to indicated USS 1 and obtain both DCI 2 & DCI 3 by decoding USS1. Here DCI 2 in USS 1 contains location of USS1 again. In this case, since USS 1 is already monitored, the UE will ignore the repeated locations. A detailed explanation of this method using a flow chart is shown in FIG. 15.

Figure 15:
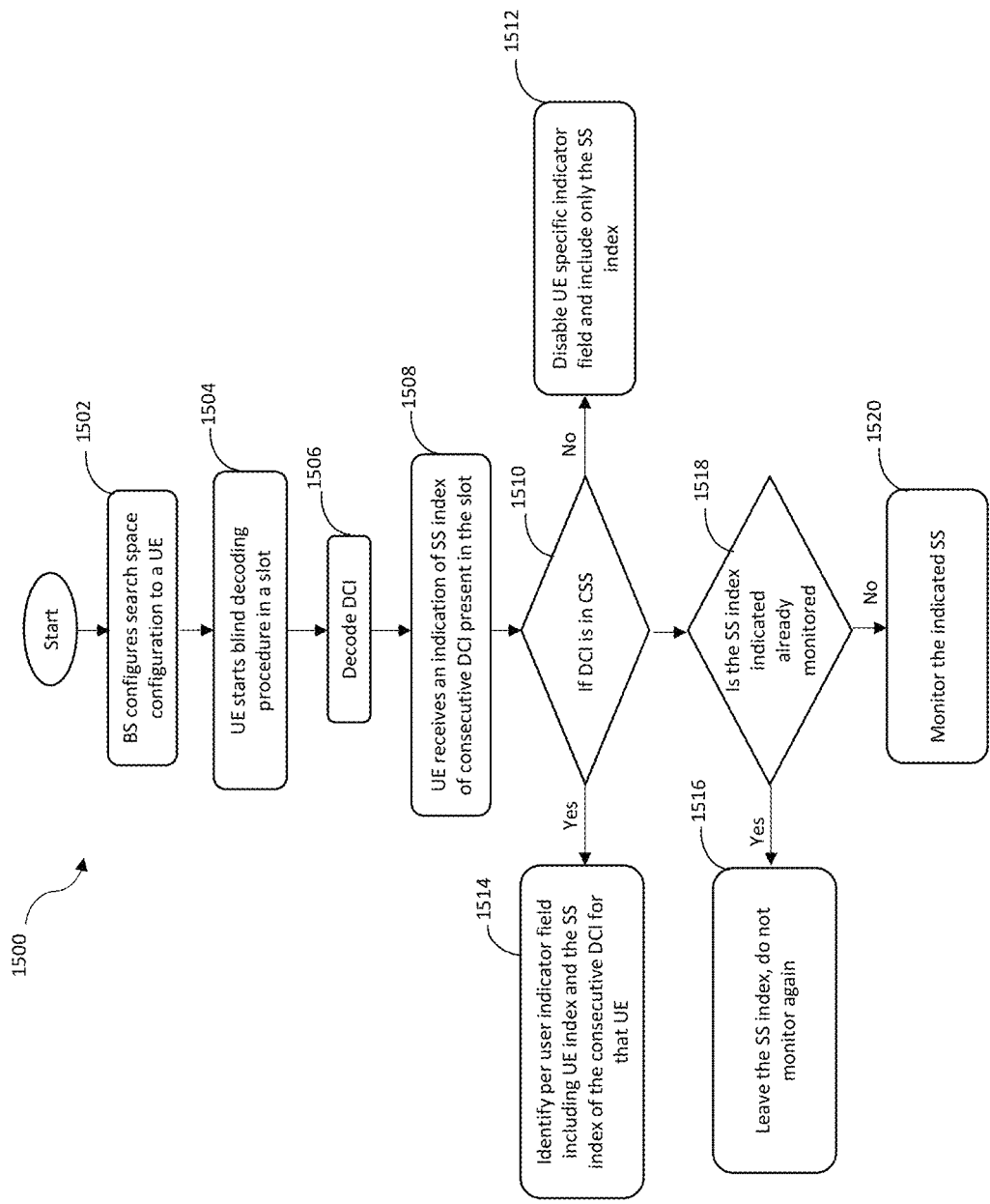
FIG. 15 illustrates flow chart showing a method of indication of SS locations of subsequent DCI in round robin manner, in accordance with an embodiment of the present invention.

As illustrated in FIG. 15, at step 1502 the BS configures search space configuration to a UE. At step 1504, UE starts blind decoding procedure in a slot. At step 1506, the UE may decode Downlink Control Information (DCI) present in the slot. At step 1508, UE receives an indication of SS index of consecutive DCI present in the slot. At 1510, it is determined if the consecutive DCI is present in a Common SS (CSS). If DCI is identified to be present in the CSS, UE specific indicator field including UE index and the SS index of the consecutive DCI for that UE is identified, at step 1514. At step 1510, when the DCI is found not to be present in CSS but present in USS, UE specific indicator field will be disabled and only the SS index will be included, at step 1512. Further, at step 1518, if SS index indicated is already monitored, then the method proceeds to step 1516 where the SS index is ignored and not monitored again. If SS index indicated is not monitored, then the method proceeds to step 1520. At step 1520, the indicated SS is monitored.

In one embodiment, there is using of DMRS correlation, channel estimate correlation and SINR estimation to reduce BD attempts. A UE will detect energy on the possible DMRS locations of every candidate CCE. If the estimated energy of a candidate CCE is below a certain threshold value, UE will eliminate or deprioritize the PDCCH candidates associated with that CCE. For example, in per 5G-NR, the channel coefficients within the REG bundle are expected to be highly correlated with each other. This assumption is valid because the REGs within the REG bundle are to be contiguous in time and/or frequency domain and precoder/beamformer applied on the REG bundle are to be same. Here, both data symbols and DMRS symbols are precoded using the same precoder/beamformer.

The DMRS sequence are derived based on a pseudo-random sequence, which is initialized using a seed. The seed is unique for a given UE which makes the DMRS sequence of a UE specific SS unique. The UE estimates the channel coefficients on DMRS resource elements of a REG bundle using its DMRS sequence. If that REG bundle is allocated to that UE, then the correlation between the estimated channel coefficients corresponding to the different REGs of the same REG bundle will be significantly higher than the case where the REG bundle is allocated to some other UE or is not allocated to any UE. This variation in correlation value is used to eliminate or deprioritize the PDCCH candidates associated with that REG bundle. If the detected energy and/or the channel correlation value is significantly smaller, the UE will eliminate the corresponding PDCCH candidate and thereby the number of PDCCH candidates are reduced which in turn reduces the number of blind decoding attempts. To avoid any misdetection of DCI, UE can deprioritize the PDCCH candidate wherein the detected energy or the channel correlation value is just below the threshold values. Though the deprioritizing method is not reducing the worst-case blind decoding attempts, it helps the UE to detect the DCI earlier than the normal behaviour of the UE. Further, the UE will estimate a Signal to Noise plus Interference Ratio (SINR) on the DMRS resource elements and map to the possible Aggregation Level (AL) set. The UE will prioritize the PDCCH candidates based on the detected energy, the correlation value between the channel estimates and the estimated SINR for the early detection of DCI. If the mapping table of SINR to AL set is predefined or configured from BS using any one of RRC signalling, MAC-CE or DCI, the number of blind decoding attempts is reduced.

Figure 16:
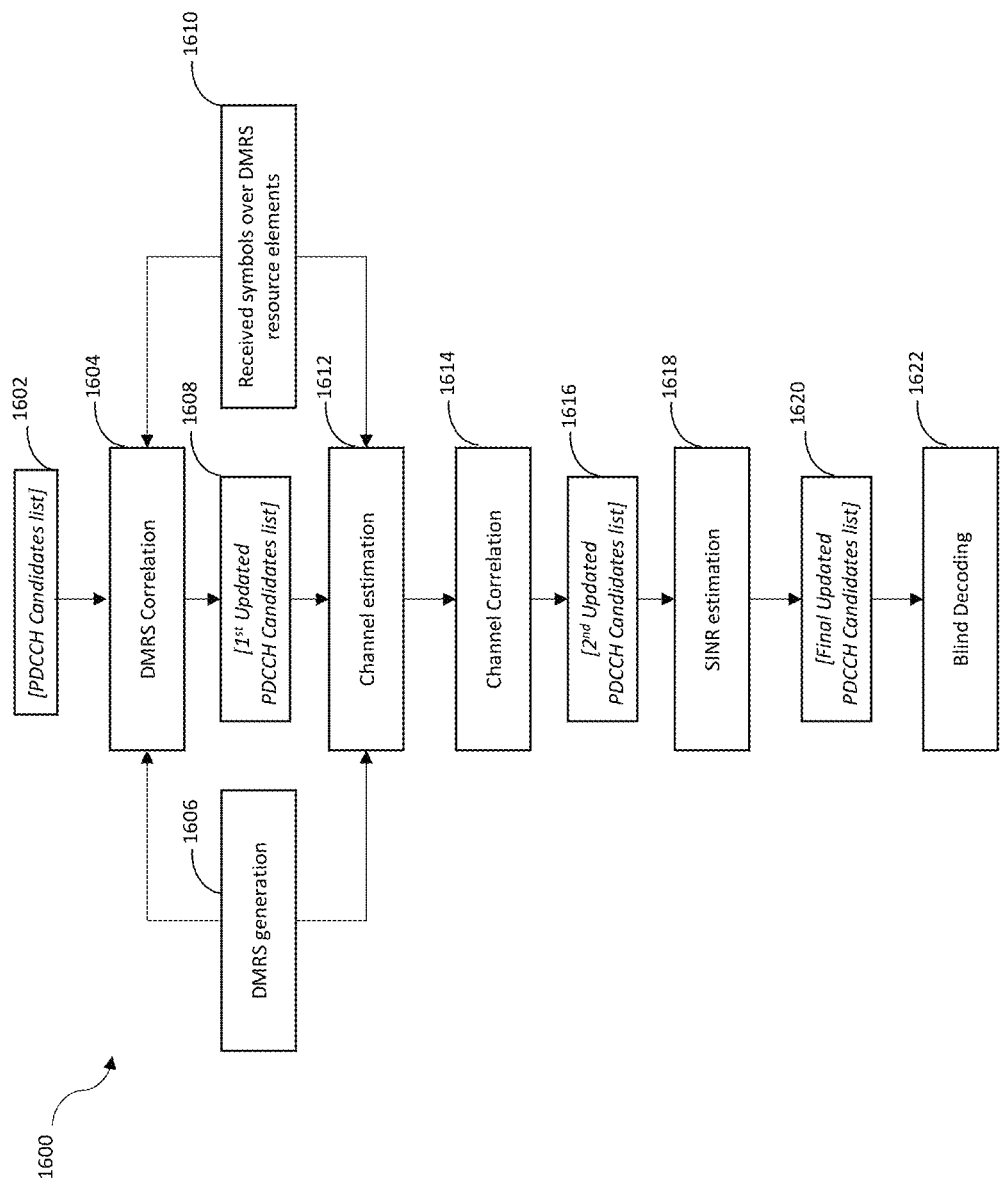
FIG. 16 illustrates flow chart showing a method of reducing the blind decoding attempts using DMRS correlation, channel estimate correlation and SINR estimation, in accordance with an embodiment of the present invention.

Flow chart of the method described above is shown in FIG. 16, wherein the flow chart includes steps 1602 through 1622. The steps are explained in detail as follows: The UE starts with initial PDCCH candidates list. For each PDCCH candidate from the initial PDCCH candidates list, the UE finds the DMRS correlation value between the received DMRS sequence and its original DMRS sequence using the DMRS correlator. Based on at least one DMRS correlation threshold, UE updates the initial PDCCH candidate list and forms the 1st updated PDCCH candidate list. The update is any one of a deletion of the PDDCH candidate and de-prioritization of the PDDCH candidate.

For each PDCCH candidate from the first updated PDCCH candidates list, the UE finds the channel correlation value between the estimated channel coefficients corresponding to the different REGs of the same REG bundle using the channel correlator. Based on at least one channel correlation threshold, UE updates the first updated PDCCH candidate list and forms the second updated PDCCH candidate list. The update is any one of a deletion of the PDDCH candidate and de-prioritization of the PDDCH candidate. For each PDCCH candidate from the 2nd updated PDCCH candidates list, UE estimates the SINR on the DMRS resource elements using the SINR estimator and map the estimated SINR to the possible aggregation level (AL) set. Based on the possible AL set, UE updates the 2nd PDCCH candidate list and forms the final updated PDCCH candidate list. The update is any one of a deletion of the PDDCH candidate and de-prioritization of the PDDCH candidate. UE starts the blind decoding process with the final PDCCH candidates list. It is to be noted that, the deletion of PDCCH candidates will reduce the number of blind decoding attempts for the UE and de-prioritization of PDCCH candidates will help the UE for the early detection of PDCCH.

In another embodiment, there is use of DMRS location to indicate additional information. For example, in 5G-NR, the DMRS locations within the CORESET is fixed (1st, 5th and 9th RE in an RB). By making the location of the DMRS flexible, it is possible to convey additional information implicitly to the UE regarding the further behaviour of DCI detection procedure. Following are the 4 possible DMRS RE positions in a REG in a symbol with the same reference signal density: {1st, 5th, and $9^{th}$}; {2nd, 6th and $10^{th}$}; {3rd, 7th and $11^{th}$}; and {4th, 8th and $12^{th}$}.

There are four combinations of positions. 2 bits of information can be conveyed using the position of the DMRS. Following are the two example configurations that is conveyed to the UE using these two bits of information.

UE may be configured with a set of priority table for DCI candidates based on AL.

The two-bit is used to select a table from the set. The set of CCE's can be divided into (up to) 4 sub-regions. The two-bit information is used to inform the UE in which sub-region, the actual DCI data starts. Introducing flexible DMRS positions will increase the number of channel estimations per PDCCH candidate. Hence, this method is more beneficial when a simpler, and a low-cost algorithm is employed at the UE to detect the presence of DMRS first and then estimating the channel upon the detection of DMRS. For example, to detect the presence of the DMRS, UE can use RSRP based DMRS detection algorithm in all the possible DMRS position combinations within the DCI candidates. Following are the steps involved:

Generate reference DMRS sequences for each of the OFDM symbol in the SS. For a selected combination of the DMRS position, extract all the complex received symbols from the corresponding REs in all the OFDM symbols within the SS. Compute the RSRP from the extracted complex symbols with the help of generated reference DMRS sequences and detect the presence of DMRS using RSRP based algorithms. If DMRS is not detected, select the next combination of DMRS position and repeat from step 2.

If DMRS is detected, obtain the implicit information conveyed by this particular DMRS position. Flow chart of the above steps are shown in FIG. 17.

Figure 17:
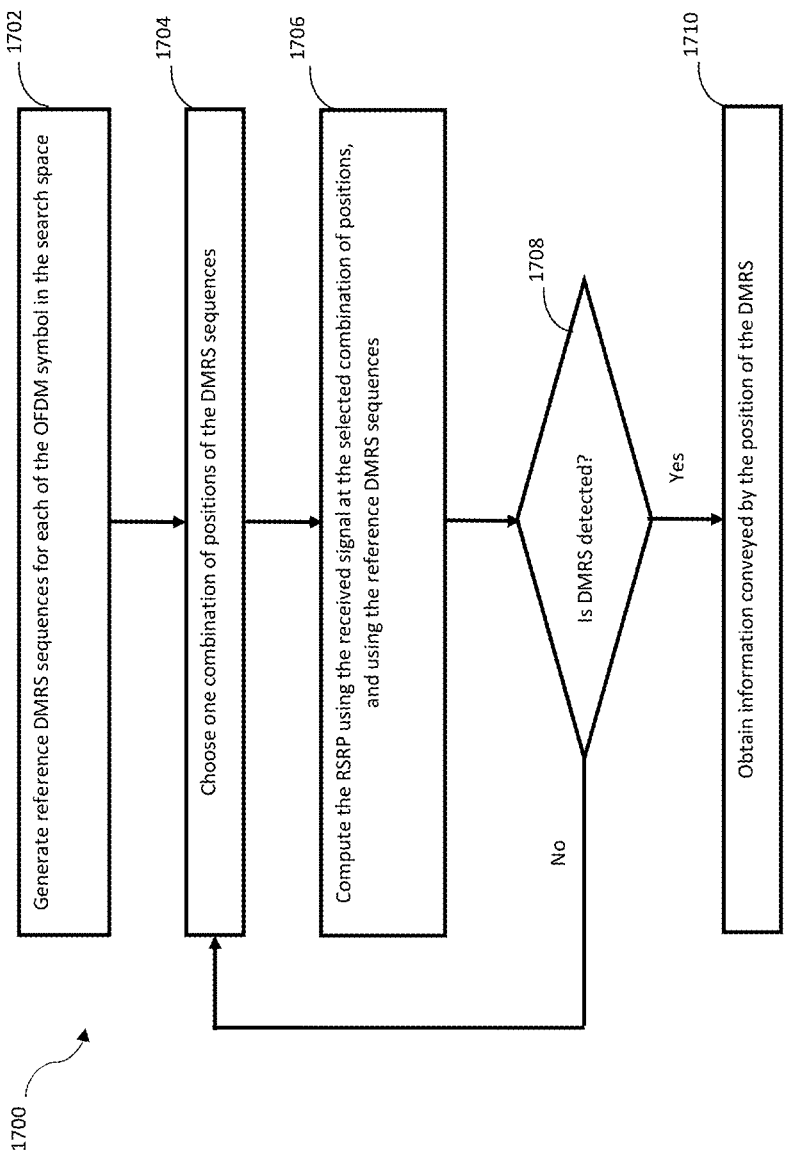
FIG. 17 illustrates flow chart showing a method of obtaining additional information based on DMRS location, in accordance with an embodiment of the present invention.

As illustrated in FIG. 17, at step 1702 reference DMRS sequences are generated for each of the OFDM symbol in the search space. At step 1704, one combination of positions of the DMRS sequences may be chosen. At step 1706, RSRP may be computed using the received signal at the selected combination and reference DMRS sequences. At step 1708, detection of DMRS is determined. If DMRS is detected, then the method proceeds to step 1710. If DMRS is not detected, then the method loops back to step 1704. At step 1710, information conveyed by the position of the DMRS is obtained.

In another embodiment, there is indication to reduce PDCCH candidates. In this method, each SS is configured with additional information about the sub-region within the CORESET in which the PDCCH candidates should be monitored. If a PDCCH candidate do not start in the signalled sub-region, then it is considered as an invalid PDCCH candidate. CORESET is divided into multiple sub-regions. The CORESET sub-region is a set of consecutive CCE's within the CORESET. The number of sub-regions will be a fixed value (ideally 2 or 4). Each sub-region will have a unique bit sequence to identify them. The BS will signal the CORESET sub-region to be monitored using appropriate signalling methods. The UE, while trying to decode a PDCCH candidate, first checks if the PDCCH candidate starts in the signalled sub-region within the CORESET. Only PDCCH candidates starting in the signalled sub-region is considered to be valid and are processed further.

Figure 18:
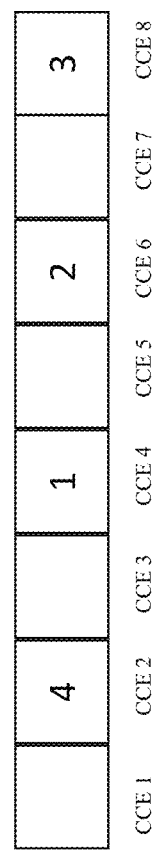
FIG. 18 illustrates possible distribution of PDCCH candidates, in accordance with an embodiment of the present invention.
Figure 19:
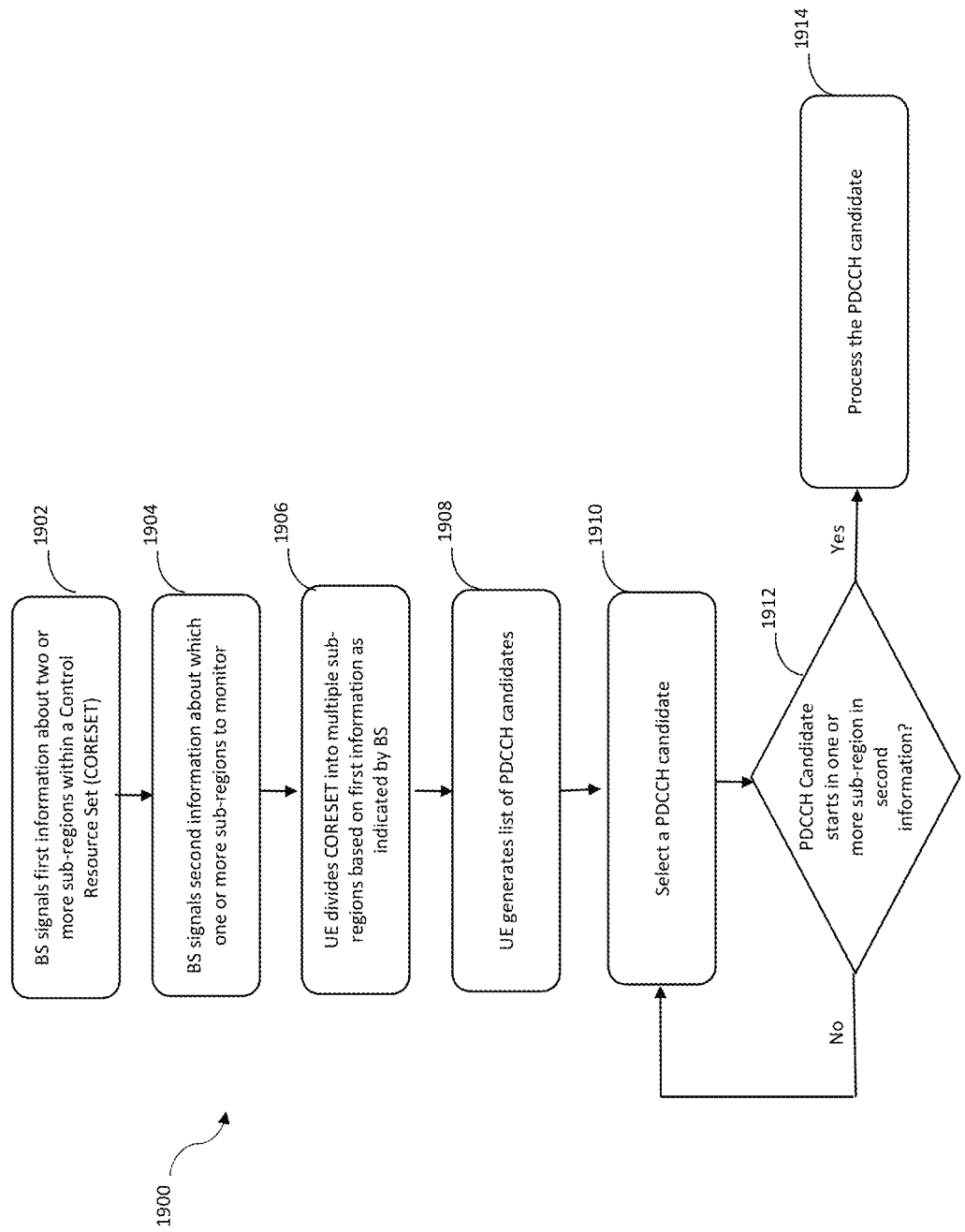
FIG. 19 illustrates flow chart showing a method of indication to reduce PDCCH candidates, in accordance with an embodiment of the present invention.

The information about the sub-region can be signalled using RRC/MAC-CE signalling or using the DMRS positions as described in Method 12. Consider a simplified scenario where a CORESET having 8 CCE's is configured a SS with 4 PDCCH candidates of AL 1. A possible distribution of PDCCH candidates is shown in FIG. 18. In the figure, 1st PDCCH candidate contains CCE 4, 2nd candidate contains CCE 6, 3rd candidate contains CCE 8 and the 4th candidate contains CCE 2. The CORESET is divided into two sub-regions with sub-region 1 consisting of CCE's 1 to 34 and sub-region 2 consisting of CCE's 5 to 8. If the BS indicates to UE to consider PDCCH candidates in sub-region 1, the UE will try to decode only PDCCH candidates 1 and 4. Flow chart of the above method is given in FIG. 19. The list of steps involved includes signalling, by the BS, first information about a plurality of sub-regions within a CORESET, at step 1902; signalling the UE with the second information about at least one sub-region to be monitored amongst the plurality of sub-regions, at step 1904; dividing the CORESET into multiple sub-regions based on the first information, at step 1906; generating a list of all possible PDCCH candidates, at step 1908; selecting a PDCCH candidate from the list of all possible PDCCH candidates, at step 1910; determining if the PDCCH candidate start within the at least one sub-region in the second information, at step 1912; and decoding/processing the PDCCH candidate when the PDCCH candidate is identified to be starting within the at least one sub-region in the second information, at step 1914, and selecting a next PDCCH candidate when the PDCCH candidate is identified not to be starting within the at least one sub-region in the second information, loop to step 1910.

In the above detailed description, reference is made to the accompanying drawings that form a part thereof, and illustrate the best mode presently contemplated for carrying out the invention. However, such description should not be considered as any limitation of scope of the present invention. The structure thus conceived in the present description is susceptible of numerous modifications and variations, all the details may furthermore be replaced with elements having technical equivalence.

We claim:

1. A method of controlling blind decoding attempts by a User Equipment (UE) in a telecommunication network, the method comprising:

configuring, by a Base Station (BS), at least one of a Search Space (SS) configuration and a value of number of Downlink Control Information (DCIs) the UE to monitor for at least one format, within a predefined time period;

signaling, by the BS, the configuration to the UE;

receiving, by the UE, the configuration signalled by the BS;

monitoring, by the UE, for the DCI in all SS sets;

counting, by the UE, number of DCIs received for each of the at least one formats;

determining, by the UE, if the number of DCIs for each of the at least one format exceeds a predefined number of DCIs the UE is allowed to monitor;

stopping, by the UE, monitoring of Physical Downlink Control Channel (PDCCH) candidates associated with one or more DCI formats identified to exceed the predefined number of DCIs the UE is allowed to receive; and removing, by the UE, PDCCH candidates corresponding to the exceeded DCI formats in remaining slots present within the predefined time period.

2. The method as claimed in claim 1, wherein when the UE receives new configurations, resets count of the number of DCIs to zero, and performs the monitoring for DCI based on the new configuration.

3. The method as claimed in claim 1, further comprising determining if a timer associated with receipt of the DCIs has expired, wherein when the timer expires, count values of the DCIs corresponding to the formats are reset to zero and the UE performs the monitoring for DCI.

4. The method as claimed in claim 1, wherein the signalling is performed using one or more of Radio Resource Control (RRC) signalling, Medium Access Control-Control Element (MAC-CE) signalling, and L1 signalling.

5. A method of controlling blind decoding attempts by a User Equipment (UE) in a telecommunication network, the method comprising:
   configuring, by a Base Station (BS), a Search Space (SS) configuration to the UE;
   receiving, by the UE, a Downlink Control Information (DCI) in a Search Space (SS) by a Base Station (BS);
   determining, by the UE, if all Physical Downlink Control Channel (PDCCH) candidates of all SS are monitored when the indicator bit in the Downlink Control Information (DCI) received in SS with identity i is determined to be set and removing PDCCH candidates corresponding to SS with identity greater than i from PDCCH candidates for blind decoding when the indicator bit in the DCI received in SS with identity i is determined not to be set; and
   resuming the blind decoding when it is determined that all the candidates for all configured SS are not monitored.

6. A method of controlling blind decoding attempts by a User Equipment (UE) in a telecommunication network, the method comprising:
   receiving, by the UE, a Downlink Control Information (DCI) indicating a number (N) of DCIs scheduled in a SS or a slot, wherein the number (N) of DCIs are signalled in all the DCIs;
   determining, by the UE, if the count of DCIs received in the SS or the slot is equal to the number (N) of DCIs; and
   removing, by the UE, remaining Physical Downlink Control Channel (PDCCH) candidates for blind decoding present in the SS or the slot when the count of DCIs received in the SS or the slot is identified to be equal to the number (N) of DCIs and then resuming the blind decoding procedure in other SS or slots, or resuming the blind decoding procedure when the count of DCIs received in the SS or the slot is identified to be not equal to the number (N) of DCIs.

* * * * *